(12) United States Patent
Lu et al.

(10) Patent No.: US 12,061,366 B2
(45) Date of Patent: Aug. 13, 2024

(54) MECHANICAL CONNECTION INTERFACE

(71) Applicant: COMMSCOPE TECHNOLOGIES LLC, Hickory, NC (US)

(72) Inventors: Yu Lu, Eden Prairie, MN (US); Ryan Kostecka, Waconia, MN (US); Erik J. Gronvall, Bloomington, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 249 days.

(21) Appl. No.: 17/612,040

(22) PCT Filed: May 14, 2020

(86) PCT No.: PCT/US2020/032871
§ 371 (c)(1),
(2) Date: Nov. 17, 2021

(87) PCT Pub. No.: WO2020/236512
PCT Pub. Date: Nov. 26, 2020

(65) Prior Publication Data
US 2022/0221658 A1    Jul. 14, 2022

Related U.S. Application Data

(60) Provisional application No. 62/849,760, filed on May 17, 2019, provisional application No. 62/891,749, filed on Aug. 26, 2019, provisional application No. 62/929,532, filed on Nov. 1, 2019, provisional application No. 62/961,044, filed on Jan. 14, 2020, provisional application No. 63/003,996, filed on Apr. 2, 2020.

(51) Int. Cl.
*G02B 6/38* (2006.01)

(52) U.S. Cl.
CPC ......... *G02B 6/3891* (2013.01); *G02B 6/3849* (2013.01); *G02B 6/3893* (2013.01); *G02B 6/3897* (2013.01)

(58) Field of Classification Search
CPC .. G02B 6/3849; G02B 6/3891; G02B 6/3893; G02B 6/3897
See application file for complete search history.

(56) References Cited

U.S. PATENT DOCUMENTS 6,151,432 A    11/2000  Nakajima et al.
7,074,066 B2 *  7/2006  Pepe .................... G02B 6/3807
                                                    439/321

(Continued)

FOREIGN PATENT DOCUMENTS

CN    205982742 U    2/2017
CN    208224542 U    12/2018

(Continued)

OTHER PUBLICATIONS

Supplementary European Search Report for Application No. 20809126.4 mailed Jan. 2, 2023, 9 pages.

(Continued)

*Primary Examiner* — Ryan A Lepisto
(74) *Attorney, Agent, or Firm* — Merchant & Gould P.C.

(57) ABSTRACT

The present disclosure relates to turn-to-secure connection interface for securing two components together. The turn-to-secure interface includes stop arrangements including a snap-fit feature.

26 Claims, 42 Drawing Sheets

(56) References Cited

U.S. PATENT DOCUMENTS

| | | | |
|---|---|---|---|
| 7,234,877 B2 * | 6/2007 | Sedor | G02B 6/3879 385/59 |
| 7,281,856 B2 * | 10/2007 | Grzegorzewska ... | G02B 6/3879 385/76 |
| 7,338,214 B1 | 3/2008 | Gurreri et al. | |
| 7,614,797 B2 | 11/2009 | Lu et al. | |
| 7,645,162 B2 | 1/2010 | Kadar-Kallen et al. | |
| 7,744,288 B2 | 6/2010 | Lu et al. | |
| 7,758,389 B2 | 7/2010 | Kadar-Kallen et al. | |
| 7,802,926 B2 | 9/2010 | Leeman et al. | |
| 8,376,628 B2 * | 2/2013 | Koreeda | G02B 6/3879 385/60 |
| 9,048,573 B2 * | 6/2015 | Grzegorzewska ... | H01R 13/625 |
| 9,733,436 B2 | 8/2017 | Van Baelen et al. | |
| 9,810,858 B2 | 11/2017 | Gniadek et al. | |
| 10,061,091 B2 | 8/2018 | Kempeneers | |
| 10,317,628 B2 | 6/2019 | Van Baelen et al. | |
| 10,338,323 B2 | 7/2019 | Lu et al. | |
| 10,707,605 B2 * | 7/2020 | Kloss | H01R 4/50 |
| 10,775,567 B2 * | 9/2020 | Yang | H01R 13/64 |
| 2006/0035509 A1 | 2/2006 | O'Connor | |
| 2008/0175546 A1 | 7/2008 | Lu et al. | |
| 2010/0322563 A1 | 12/2010 | Melton et al. | |
| 2014/0314379 A1 | 10/2014 | Lu et al. | |
| 2015/0177467 A1 | 6/2015 | Gniadek et al. | |
| 2016/0139343 A1 | 5/2016 | Dean, Jr. et al. | |
| 2017/0139158 A1 | 5/2017 | Coenegracht | |
| 2017/0333624 A1 | 11/2017 | Tucker et al. | |
| 2017/0336577 A1 | 11/2017 | Kaplan | |
| 2018/0143381 A1 | 5/2018 | Liu et al. | |

FOREIGN PATENT DOCUMENTS

| | | |
|---|---|---|
| EP | 2 302 431 A1 | 3/2011 |
| JP | 2013-057976 A | 3/2013 |
| JP | 2017504843 A | 2/2017 |
| JP | 2017533032 A | 11/2017 |
| KR | 10-2012-0101587 A | 9/2012 |

OTHER PUBLICATIONS

International Search Report and Written Opinion of the International Searching Authority for International Patent Application No. PCT/US2020/032871 mailed Oct. 20, 2020, 11 pages.

Chinese First Office Action for Application No. 202080046896.0 mailed Aug. 25, 2022 (with English Translation), 14 pages.

Japanese Office Action for Application No. 2021-568826 mailed Mar. 5, 2024, 5 pages.

* cited by examiner

MECHANICAL CONNECTION INTERFACE

CROSS-REFERENCE TO RELATED APPLICATIONS

This application is a National Stage Application of PCT/US2020/032871, filed on May 14, 2020, which claims the benefit of U.S. Patent Application Ser. No. 62/849,760, filed on May 17, 2019, and claims the benefit of U.S. Patent Application Ser. No. 62/891,749, filed on Aug. 26, 2019, and claims the benefit of U.S. Patent Application Ser. No. 62/929,532, filed on Nov. 1, 2019, and claims the benefit of U.S. Patent Application Ser. No. 62/961,044, filed on Jan. 14, 2020, and claims the benefit of U.S. Patent Application Ser. No. 63/003,996, filed on Apr. 2, 2020, the disclosures of which are incorporated herein by reference in their entireties. To the extent appropriate, a claim of priority is made to each of the above disclosed applications.

TECHNICAL FIELD

The present disclosure relates generally to mechanical connection interfaces. More particularly, the present disclosure relates to turn-to-secure mechanical connection interfaces that may be used with telecommunications connectors.

BACKGROUND

A turn-to-secure connection interface is an interface that is connected and disconnected by a twisting motion. Turn-to-secure connection interfaces have been used with telecommunications connectors. For example, turn-to-secure connection interfaces have been used for securing telecommunications connectors to one another, for securing telecommunications connectors to telecommunication adapters, and for interconnecting separate pieces of telecommunications connectors. U.S. Pat. No. 7,744,288 and European Patent 2302431 disclose telecommunications connectors utilizing turn-to-secure connection interfaces.

SUMMARY

Aspects of the present disclosure relate to turn-to-secure connection interfaces for coupling together two components. In one example, the two components can be parts of a telecommunications connection system such as a fiber optic connection system. In certain examples, each of the components can be a part of a telecommunications connector or a telecommunications adapter. In one example, one of the components can include a fiber optic adapter or part of a fiber optic adapter and the other component can include a fiber optic connector or a part of a fiber optic connector. In other examples, the components can be different parts of a fiber optic connector. In still other examples, one of the components can be a dust cap and the other component can be a retention sleeve of a fiber optic connector.

In certain examples, components embodying the turn-to-secure interface are rotationally movable about a central axis relative to each other between first and second rotational states. The components can include stop arrangements that limit a range of rotational movement between the first and second rotational states. The stop arrangements can also be configured to allow the components to be axially separated from one another when in the first rotational state, and to prevent the components from being axially separated from one another when in the second rotational state.

The components can include a snap-fit arrangement for resisting movement from the second rotational state to the first rotational state. In one example, the snap-fit configuration can be designed such that the snap-fit arrangement is required to be damaged (e.g., broken) for the components to be rotated relative to each other from the second rotational state to the first rotational state. In other examples, the snap-fit configuration may be configured to flex, without breaking or otherwise being damaged, to accommodate movement from the second rotational state to the first rotational state. In certain examples, the components do not move axially relative to one another as the components are rotated between the first and second rotational states.

Another aspect of the present disclosure relates to a turn-to-secure connection interface including a first component defining an axis. The first component includes a rotational securement latch. The first component also includes a first stop arrangement including a first stop surface that faces in a first axial direction axis, and a second stop surface that faces in a second axial direction along the axis. The first axial direction is opposite from the second axial direction. The first component also includes a third stop surface that faces in a first rotational direction about the axis. The turn-to-secure connection interface also includes a second component including a rotational securement catch. The second component also includes a second stop arrangement including a fourth stop surface that faces in the second axial direction, a fifth stop surface that faces in the first axial direction, and a sixth stop surface that faces in a second rotational direction about the axis that is opposite from the first rotational direction. The turn-to-secure connection interface is positionable in a first rotational state in which the first stop surface opposes the fourth stop surface, the second stop surface is rotationally offset from the fifth stop surface, and the third stop surface is rotationally offset from the sixth stop surface by a rotation angle less than or equal to 360 degrees. The turn-to-secure connection interface is also positionable in a second rotational state in which the first stop surface opposes the fourth stop surface, the second stop surface opposes the fifth stop surface, and the third stop surface opposes and is adjacent to the sixth stop surface. The turn-to-secure connection interface is movable from the first rotational state to the second rotational state by rotating the first and second components relative to one another through the rotation angle. The rotational securement latch and the rotational securement catch circumferentially oppose one another when the turn-to-secure connection interface is in the second rotational state to resist the turn-to-secure interface from rotating from the second rotational state to the first rotational state. Contact between the rotational securement latch and the rotational securement catch as the turn-to-secure connection interface is moved from the first rotational state to the second rotational state causes the rotational securement latch to resiliently flex from a securement position to a clearance position to allow the rotational securement latch and the rotational securement catch to move rotationally past one another. The rotational securement latch elastically returns to the securement position after the rotational securement latch and the rotational securement catch have moved past one another to resist the turn-to-secure interface from rotating from the second rotational state to the first rotational state.

Another aspect of the present disclosure relates to a turn-to-secure connection interface including a first component defining a first axis and a second component defining a second axis. The first and second components are configured to be axially inserted together and mechanically coupled together when the first and second components are coaxially aligned. The first component includes a first stop arrangement and the second component includes a second stop arrangement. The first and second components are configured to be rotated relative to one another about the first and second axes between first and second rotational states when the first and second components have been axially inserted together. The first and second stop arrangements are configured to limit a range of rotational movement between the first and second rotational states. The first and second stop arrangements are also configured to allow the first and second components to be axially separated from one another when the first and second components are in the first rotational state, and to prevent the first and second components from being axially separated from one another when the first and second components are in the second rotational state. The first and second components further include a snap-fit arrangement for resisting movement of the first and second components from the second rotational state to the first rotational state.

Another aspect of the present disclosure relates to a fiber optic assembly including a fiber optic connector having a connector end. The fiber optic connector defines an axis. The fiber optic connector supports an optical fiber having a fiber end adjacent the connector end. The fiber optic connector further includes a retention sleeve. The fiber optic assembly also includes a cap that mounts over the connector end for protecting the fiber end. The cap is secured to the fiber optic connector by the retention sleeve. The retention sleeve and the cap are axially insertable together and when inserted together are rotatable relative to one another between a first rotational state and a second rotational state. The cap is axially removable from the fiber optic connector when the retention sleeve and the cap are in the first rotational state. The cap is not axially removable from the fiber optic connector when the retention sleeve and the cap are in the second rotational state. The cap and the retention sleeve include a snap-fit interface for retaining the cap and the retention sleeve in the second rotational state. The snap-fit interface is required to be damaged to move the retention sleeve and the cap from the second rotational state to the first rotational state.

A further aspect of the present disclosure relates to a fiber optic connector including a connector body defining a connector axis. The fiber optic connector also includes a retention sleeve for securing the fiber optic connector to a fiber optic adapter. The retention sleeve is mounted on the connector body and is turnable relative to the connector body about the connector axis. The retention sleeve includes a stop arrangement within the retention sleeve adapted to interface with a corresponding stop arrangement of the fiber optic adapter. The stop arrangement of the retention sleeve includes axial stop surfaces that face in opposite first and second axial directions along the connector axis. The stop arrangement of the retention sleeve also includes rotational stop surfaces that face in opposite first and second rotational directions about the connector axis.

Still another aspect of the present disclosure relates to a fiber optic adapter including an adapter body defining an adapter axis. The adapter body includes a stop arrangement integrated within an exterior of the adapter body for interfacing with a corresponding stop arrangement of a fiber optic connector. The stop arrangement of the adapter body includes axial stop surfaces that face in opposite first and second axial directions along the adapter axis. The stop arrangement of the adapter body also includes rotational stop surfaces that face in opposite first and second rotational directions about the adapter axis.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated herein and constitute a part of the description, illustrate several aspects of the present disclosure. A brief description of the drawings is as follows.

DETAILED DESCRIPTION

Figure 1:
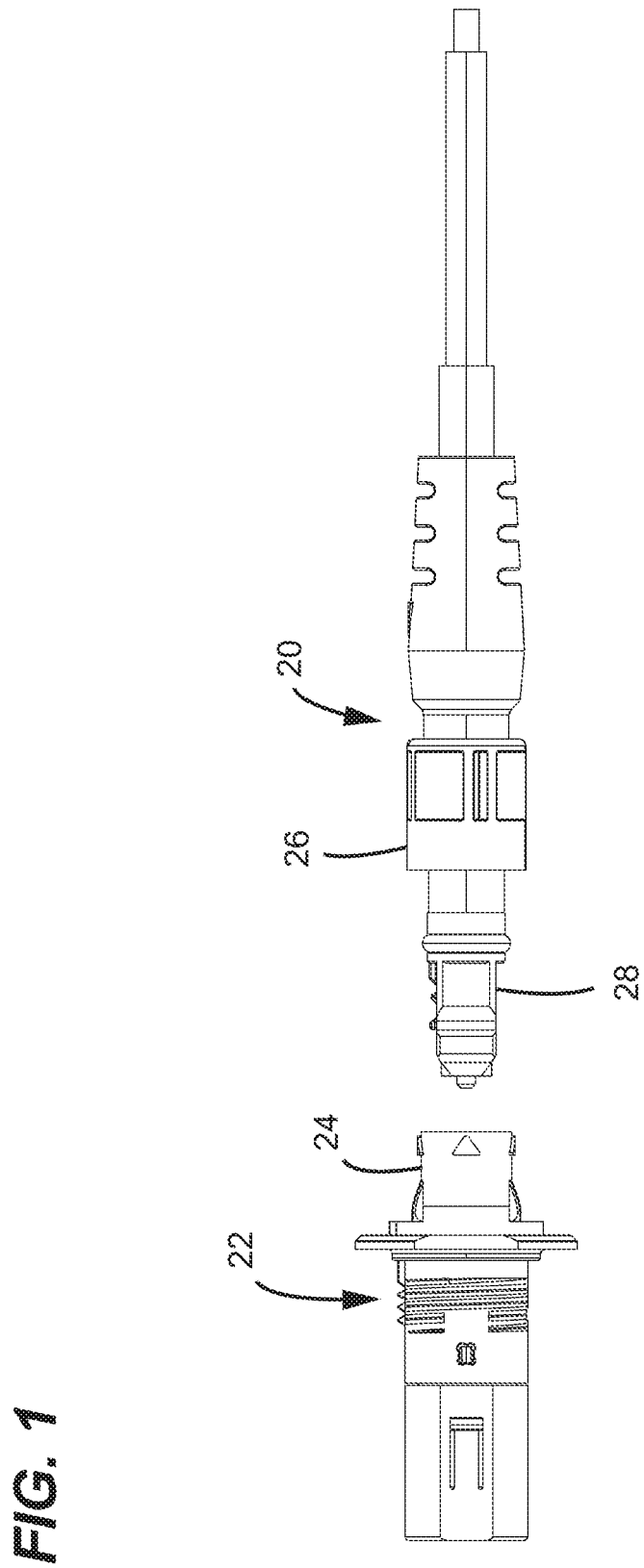
FIG. 1 depicts a fiber optic connector and a corresponding fiber optic adapter including a turn-to-secure connection interface in accordance with the principles of the present disclosure for mechanically securing the fiber optic connector and the fiber optic adapter together.
Figure 2:
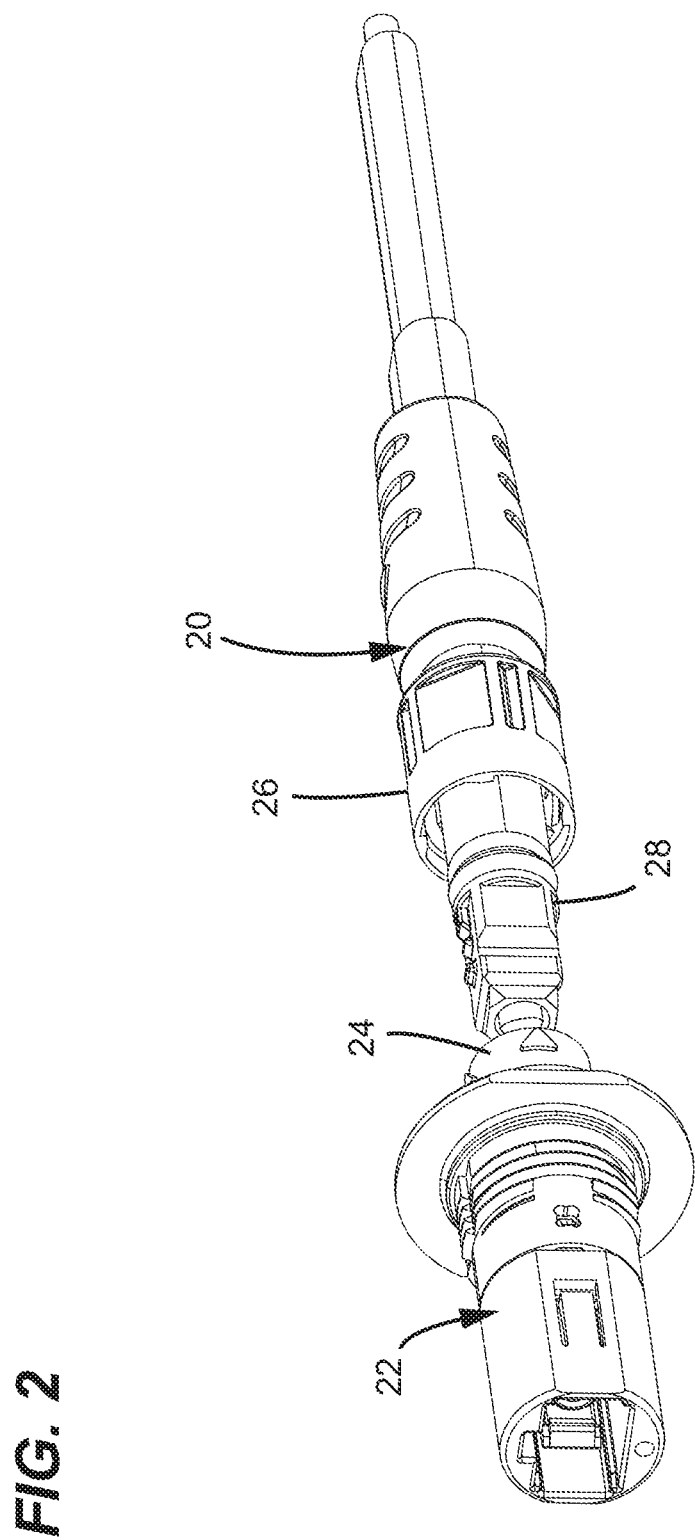
FIG. 2 is another view of the fiber optic adapter and the fiber optic connector of FIG. 1.
Figure 3:
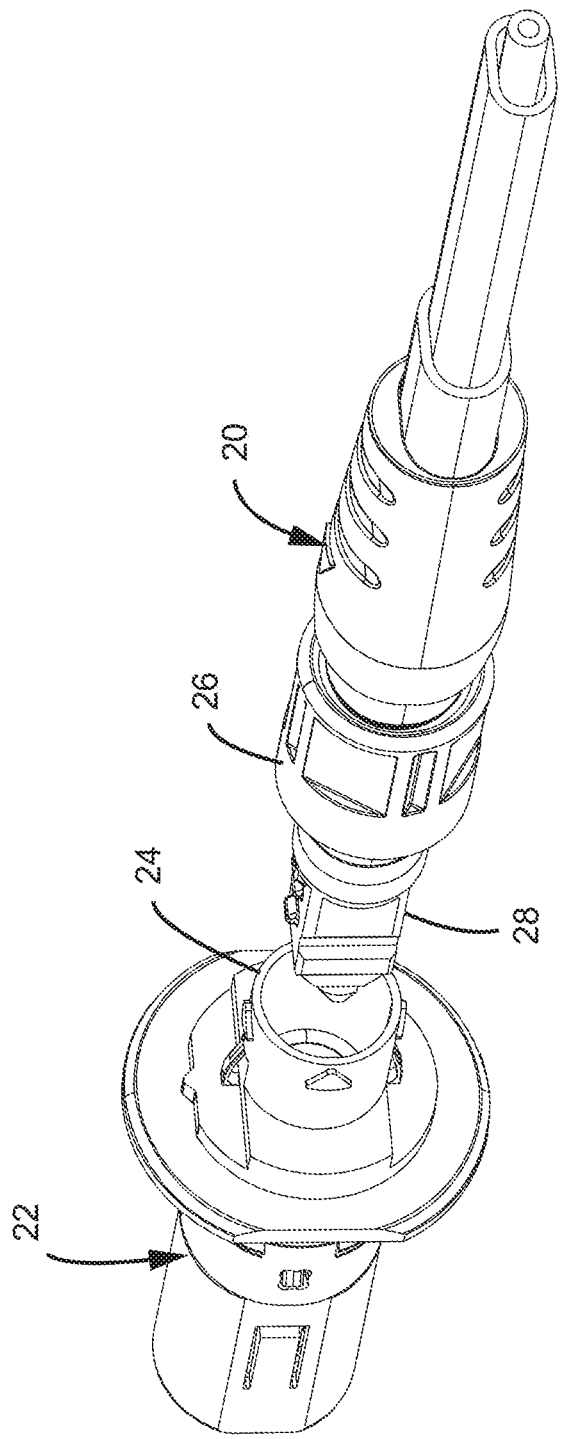
FIG. 3 is a further view of the fiber optic connector and the fiber optic adapter of FIG. 1.
Figure 4:
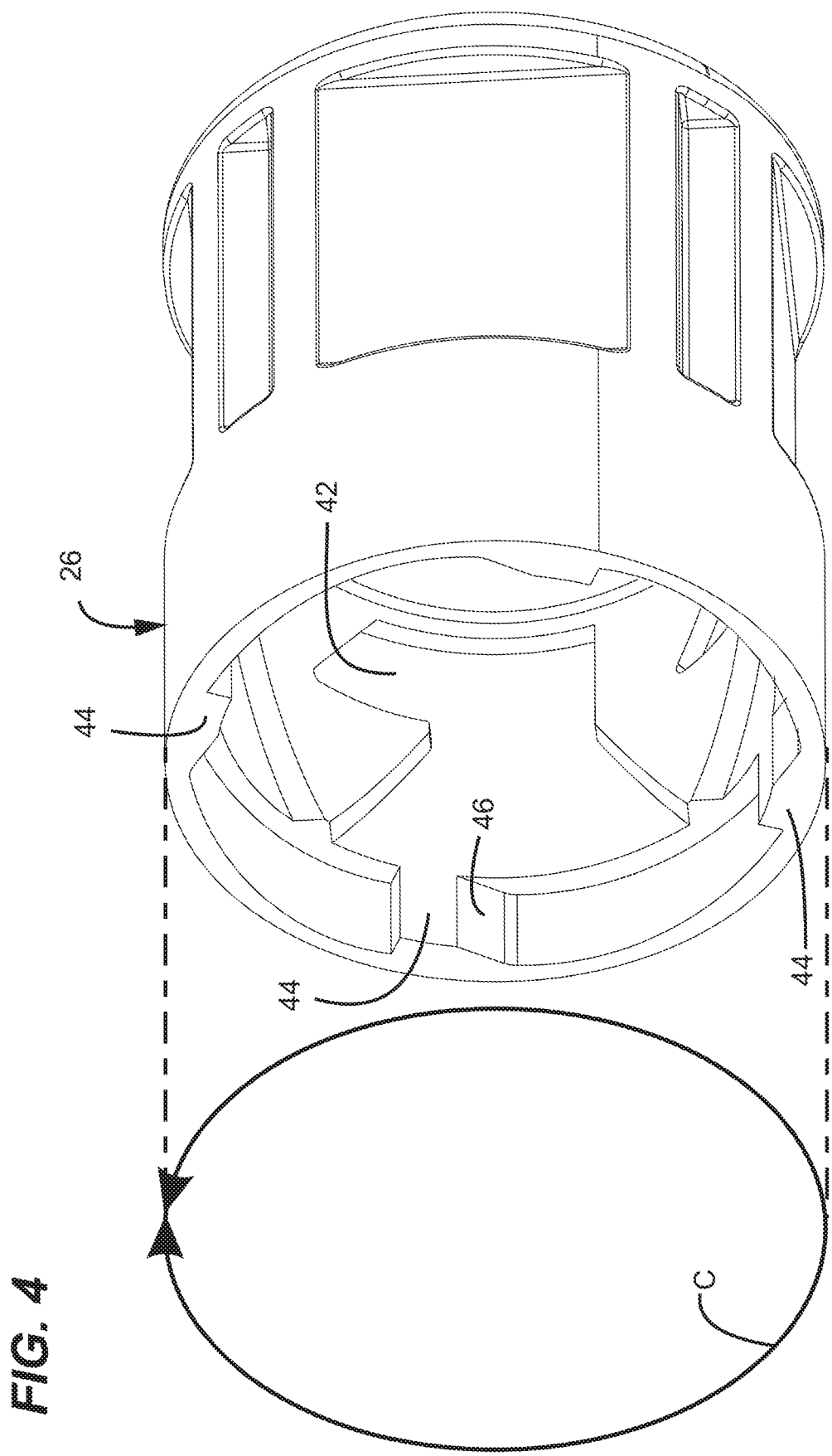
FIG. 4 is a perspective view showing a first end of a retention sleeve of the fiber optic connector of FIGS. 1-3 which forms part of the turn-to-secure connection interface.
Figure 5:
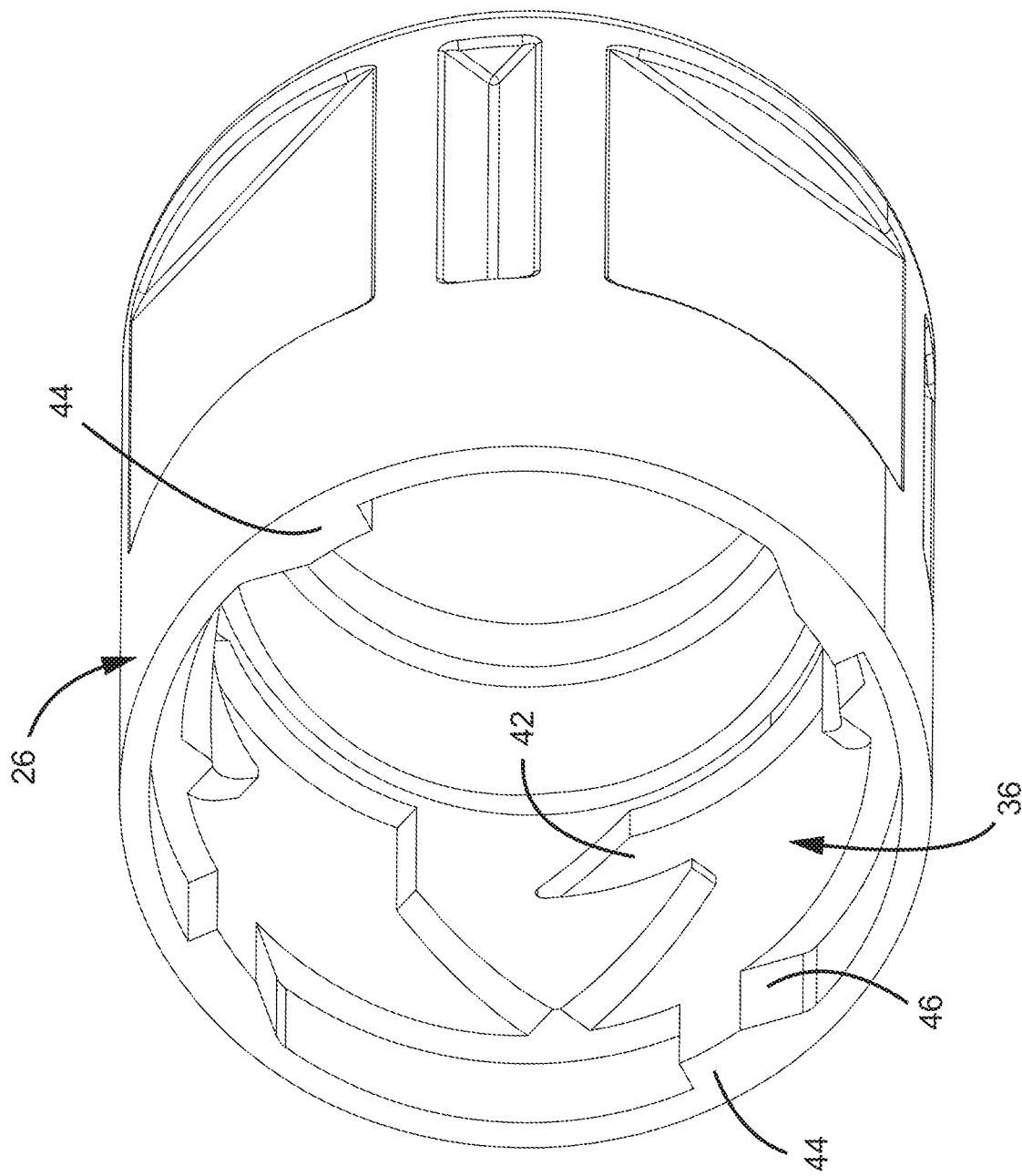
FIG. 5 is another perspective view of the first end of the retention sleeve of FIG. 4.
Figure 6:
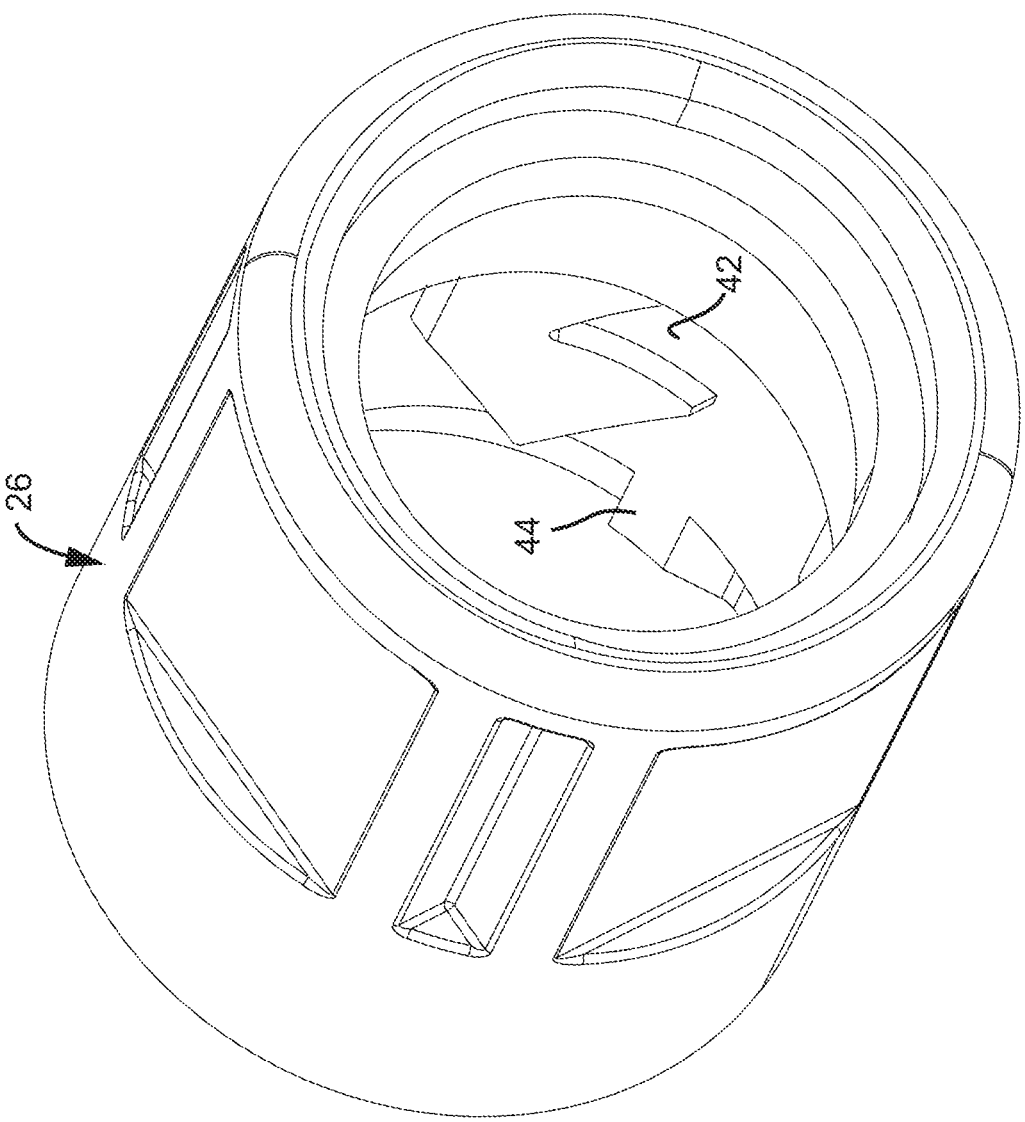
FIG. 6 is a perspective view of an opposite second end of the retention sleeve of FIG. 4.

FIGS. 1-3 depict a fiber optic connector 20 and a corresponding fiber optic adapter 22 including a turn-to-secure mechanical connection interface in accordance with the principles of the present disclosure for securing the fiber optic connector 20 and the fiber optic adapter 22 together. In the depicted example, the turn-to-secure connection interface includes a first component depicted as an outer adapter body 24 of the fiber optic adapter 22 and a second component depicted as an outer retaining sleeve 26 of the fiber optic connector 20. The retaining sleeve 26 is mounted over a connector body 28 of the fiber optic connector 20 and configured to rotate relative to the connector body 28 about a central axis defined by the fiber optic connector 20. It will be appreciated that the turn-to-secure connection interface incorporated as part of the retaining sleeve 26 and the outer adapter body 24 is adapted to retain the connector body 28 within the fiber optic adapter 22. In use, the connector body 28 is inserted into the fiber optic adapter 22, and then the retaining sleeve 26 is slid axially over the outer adapter body 24 to a first inserted position in which the retaining sleeve 26 and the outer adapter body 24 are at a first rotational state relative to one another. Next, the retaining sleeve 26 is turned relative to the connector body 28 and the outer adapter body 24 from the first rotational state to a second rotational state. In the first rotational state, the retaining sleeve 26 can be pulled axially from the outer adapter body 24. In contrast, in the second rotational state, stop arrangements of the turn-to-secure connection interface prevent the retaining sleeve 26 from being axially pulled from the outer adapter body 24. An internal stop, such as a shoulder within the retaining sleeve 26, opposes a corresponding stop on the connector body 28 such that when the retaining sleeve 26 is in the second rotational state, the retaining sleeve 26 prevents the connector body 28 from being withdrawn from the fiber optic adapter 22. In a preferred example, a snap-fit arrangement is provided for retaining the retaining sleeve 26 in the second rotational state relative to the outer adapter body 24.

Figure 7:
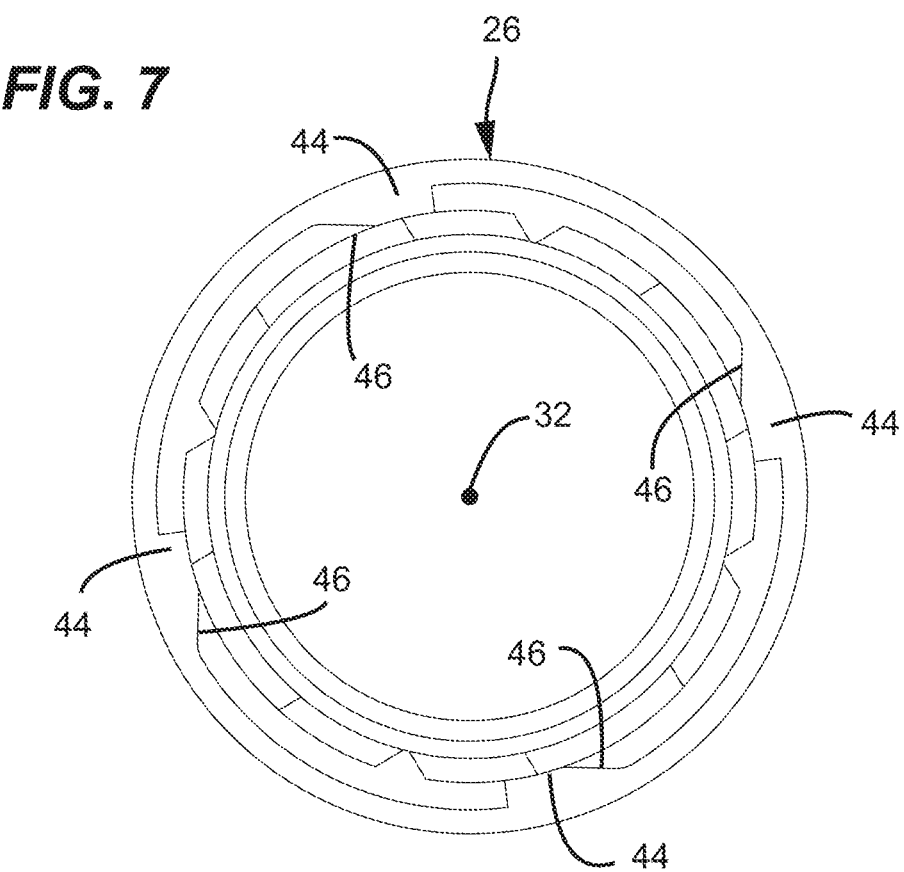
FIG. 7 is an end view of the first end of the retention sleeve of FIG. 4.
Figure 8:
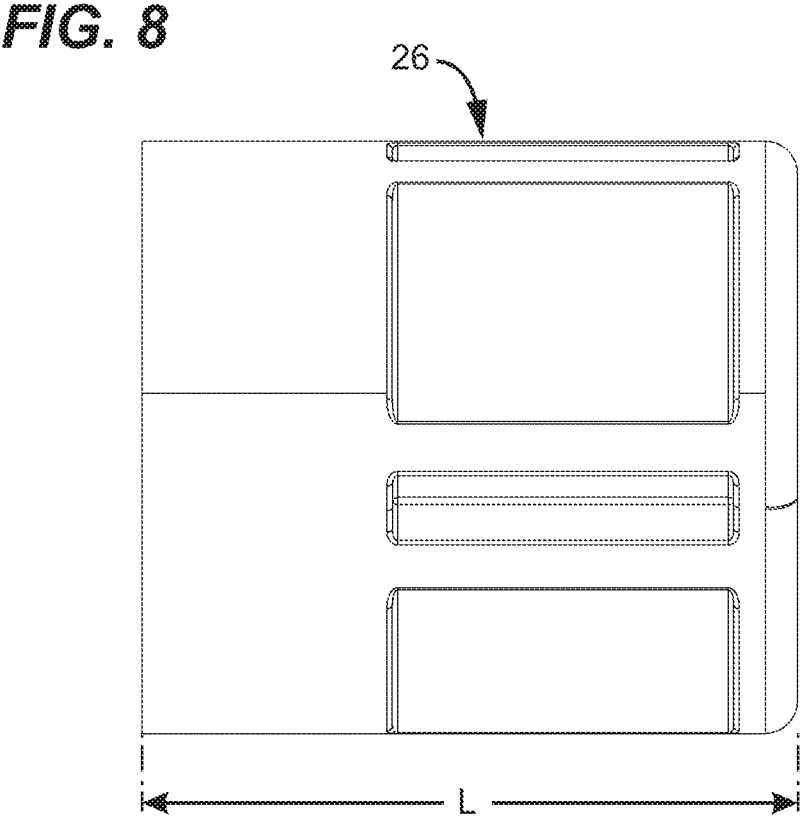
FIG. 8 is a side view of the retention sleeve of FIG. 4.
Figure 13:
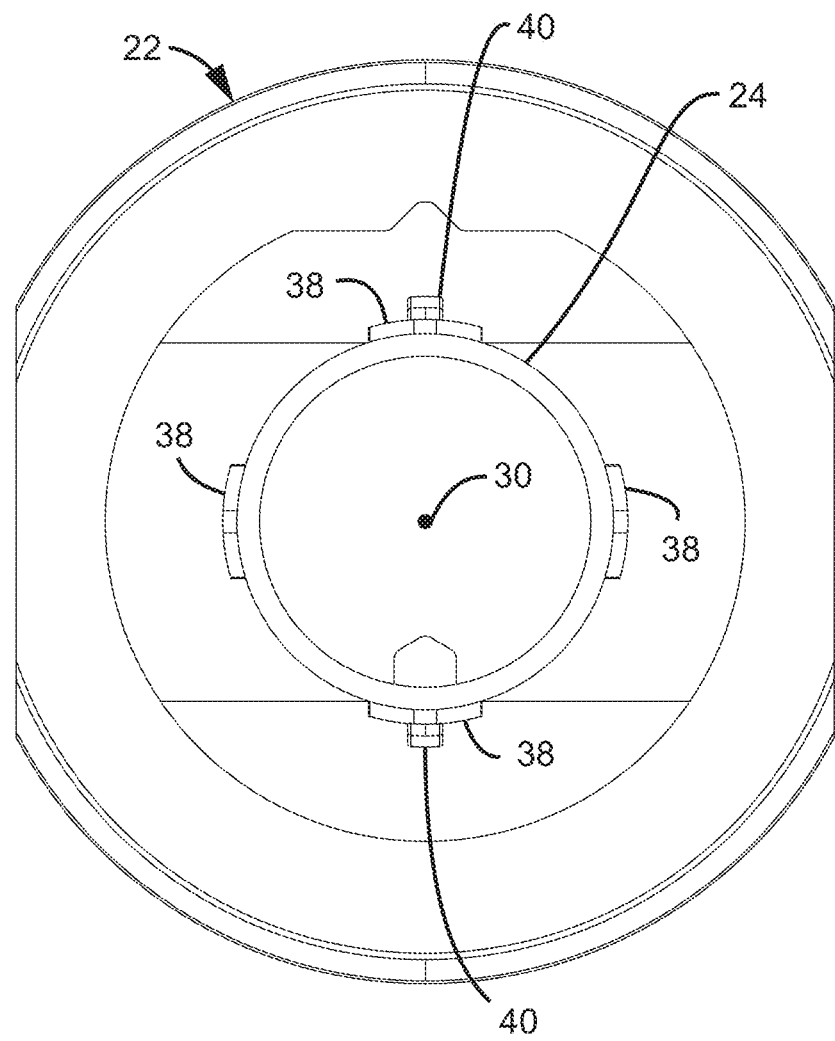
FIG. 13 is an end view of the fiber optic adapter of FIG. 10.

The outer adapter body 24 defines an adapter axis 30 (see FIG. 13) and the retaining sleeve 26 defines a sleeve axis 32 (see FIG. 7). The outer adapter body 24 and the retaining sleeve 26 are configured to be axially inserted together and mechanically coupled together when the outer adapter body 24 and the retaining sleeve 26 are co-axially aligned. The outer adapter body 24 includes a first stop arrangement 34 of the turn-to-secure connection interface and the retaining sleeve 26 defines a second stop arrangement 36 of the turn-to-secure connection interface.

Figure 14:
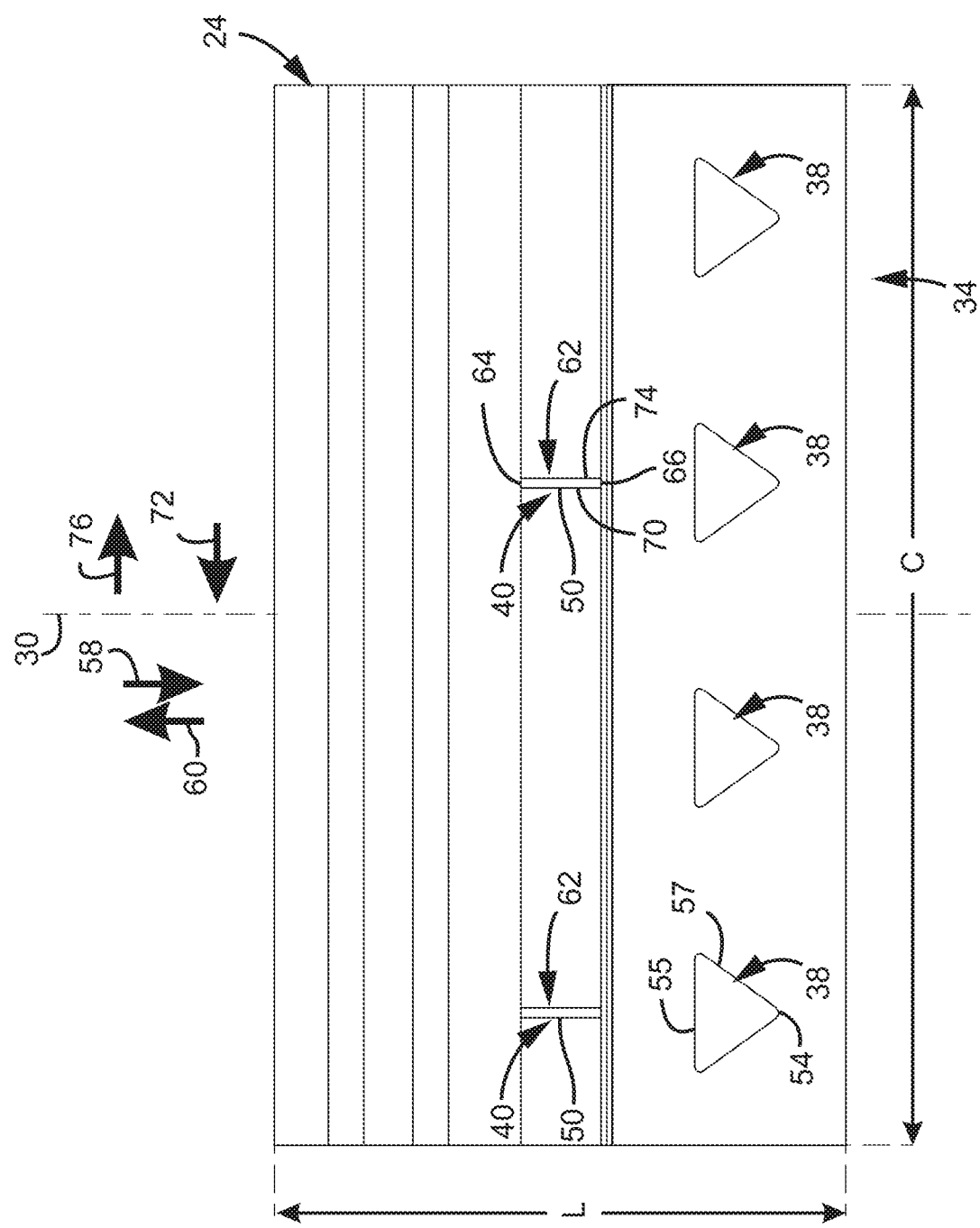
FIG. 14 is a diagrammatic view of a portion of the fiber optic adapter of FIGS. 10-13 in which the portion has been cut axially and laid flat such that an exterior of the entire adapter body is visible in plan view, a circumference of the adapter body is labeled C and a length of the portion of the adapter body is labeled L.

Referring to FIGS. 10-14, the first stop arrangement 34 includes a plurality of triangular projections 38 at an exterior of the outer adapter body 24. The triangular projections 38 are spaced about a circumference C of the outer adapter body 24. FIG. 14 shows the outer adapter body 24 axially cut at one circumferential location and laid flat so that the entire circumference C of the outer adapter body 24 and a length L of the outer adapter body 24 are shown in plan view. The triangular projections 38 are spaced uniformly about the circumference C. The first stop arrangement 34 also includes at least one snap-fit feature that forms part of the snap-fit arrangement. As depicted at FIGS. 10-14, the snap-fit feature includes two resilient rotational securement latches 40 positioned on opposite sides of the outer adapter body 24.

Figure 9:
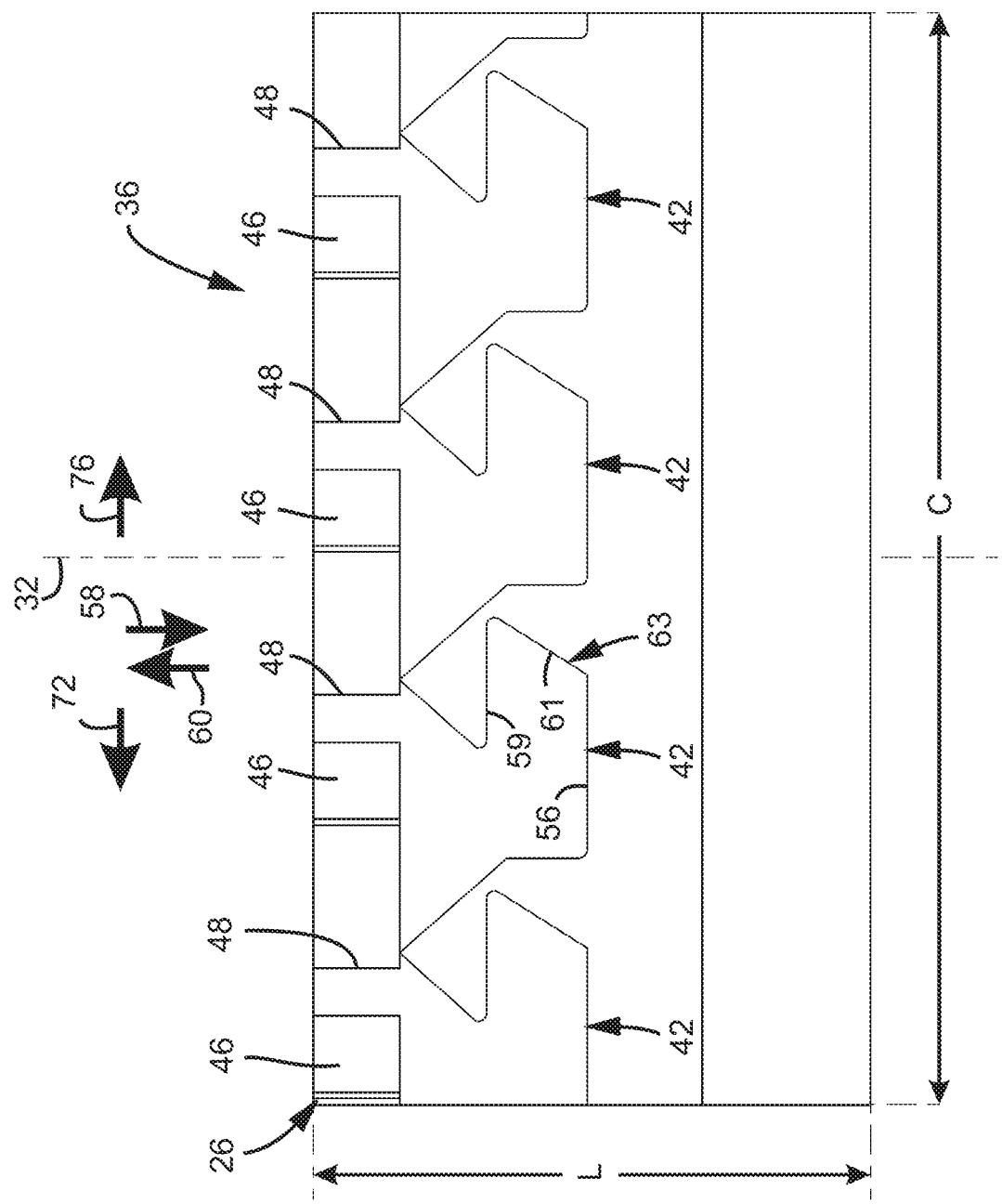
FIG. 9 is a diagrammatic view in which the retention sleeve of FIG. 4 has been axially cut and laid flat so that an interior of the retention sleeve is visible in plan view, a circumference of the retention sleeve is labeled C and a length of the retention sleeve is labeled L.

The second stop arrangement 36 of the turn-to-secure connection interface includes a plurality of recesses 42 positioned within the interior of the retaining sleeve 26 (see FIGS. 4-10). The recesses 42 are spaced uniformly about a circumference C of the retaining sleeve 26. As shown at FIG. 9, the retaining sleeve 26 has been axially cut at one location and laid flat so that the entire interior of the retaining sleeve 26 is visible in plan view. As shown at FIG. 9, the recesses 42 are uniformly spaced along a circumference C of the retaining sleeve 26.

The second stop arrangement 36 also includes a plurality of snap-fit features that are part of the snap-fit arrangement for retaining the retaining sleeve 26 in the second rotational state relative to the outer adapter body 24. The snap-fit features are depicted as rotational securement catches 44 spaced uniformly about the circumference of the retaining sleeve 26 within the interior of retaining sleeve 26. Each of the rotational securement catches 44 includes a ramp surface 46 and a securement surface 48.

It will be appreciated that the first and second stop arrangements 34, 36 are adapted to provide the turn-to-secure connection interface with a number of functions. For example, when the retaining sleeve 26 and the outer adapter body 24 have been initially inserted together, the adapter axis 30 and the sleeve axis 32 are coaxially aligned and the retaining sleeve 26 can be rotated relative to the outer adapter body 24 about the axes 30, 32 between the first and second rotational states. The first and second stop arrangements 34, 36 are configured to limit a range of rotational movement that is permitted between the first and second rotational states. In one example, the range of rotational movement permitted is less than or equal to 360 degrees, or less than or equal to 180 degrees, or less than or equal to 90 degrees. In the depicted example, the interaction between the first and second stop arrangements 34, 36 limits the range of rotation between the first and second rotational states to less than or equal to 90 degrees. The first and second stop arrangements 34, 36 are also configured to allow the fiber optic adapter 22 and the retaining sleeve 26 to be axially inserted together and axially separated from one another when the retaining sleeve 26 and the outer adapter body 24 are in the first rotational state. Furthermore, the first and second stop arrangements 34, 36 are configured such that when the retaining sleeve 26 and the outer adapter body 24 are in the second rotational state, interference between the first and second stop arrangements 34, 36 prevents the retaining sleeve 26 from being axially removed from the outer adapter body 24.

The snap-fit arrangement of the turn-to-secure connection interface is configured to resist rotational movement between the retaining sleeve 26 and the outer adapter body 24 toward the first rotational state when the outer adapter body 24 and the retaining sleeve 26 are in the second rotational state. The rotational securement latches 40 and the rotational securement catches 44 are configured such that contact between the ramp surfaces 46 of the rotational securement catches 44 and the rotational securement latches 40 as the retaining sleeve 26 is rotated from the first rotational state to the second rotational state causes the rotational securement latches 40 to resiliently flex from a securement position to a clearance position to allow the rotational securement latches 40 and the rotational securement catches 44 to move rotationally past one another. The rotational securement latches 40 are configured to elastically return to the securement position after the rotational securement latches 40 and the rotational securement catches 44 have moved past one another. Once the retaining sleeve 26 has been moved to the second rotational state and the rotational securement latches 40 have moved back to the securement position the securement surfaces 48 of the rotational securement catches 44 oppose stop surfaces 50 at sides of the rotational securement latches 40 to resist the retaining sleeve 26 from rotating from the second rotational state back to the first rotational state.

Figure 10:
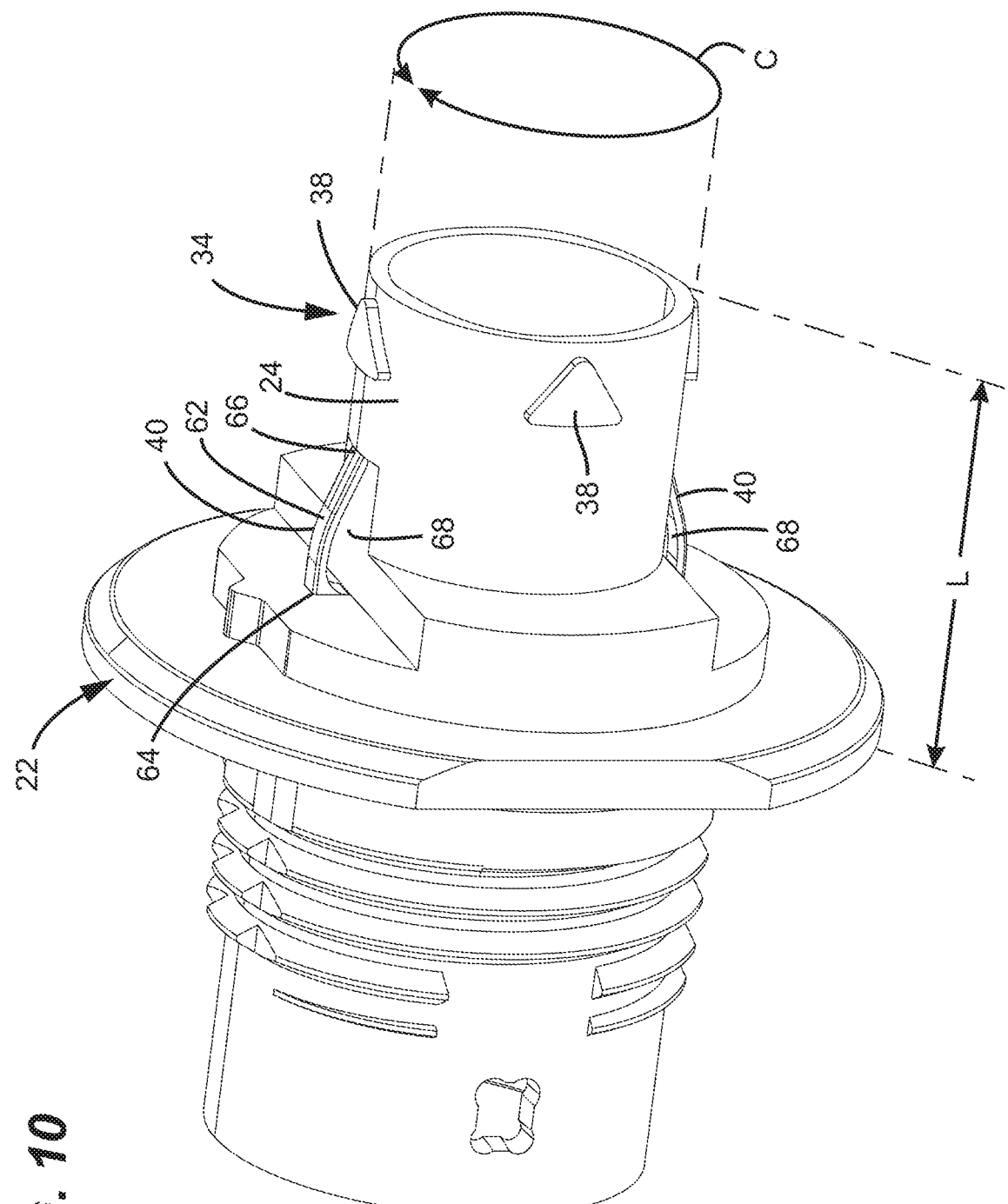
FIG. 10 is a perspective view of the fiber optic adapter of FIGS. 1-3 showing an example snap-fit latch.
Figure 11:
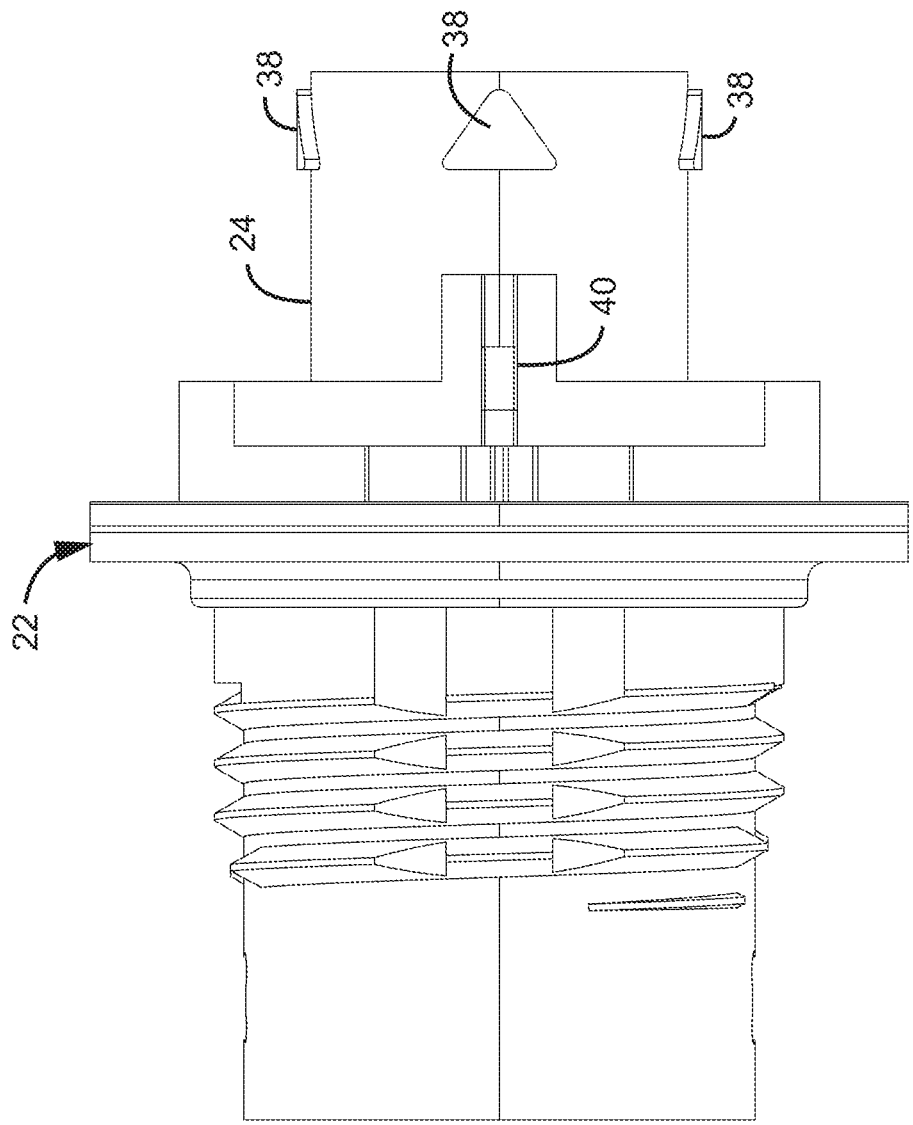
FIG. 11 is a side view of the fiber optic adapter of FIG. 10.
Figure 12:
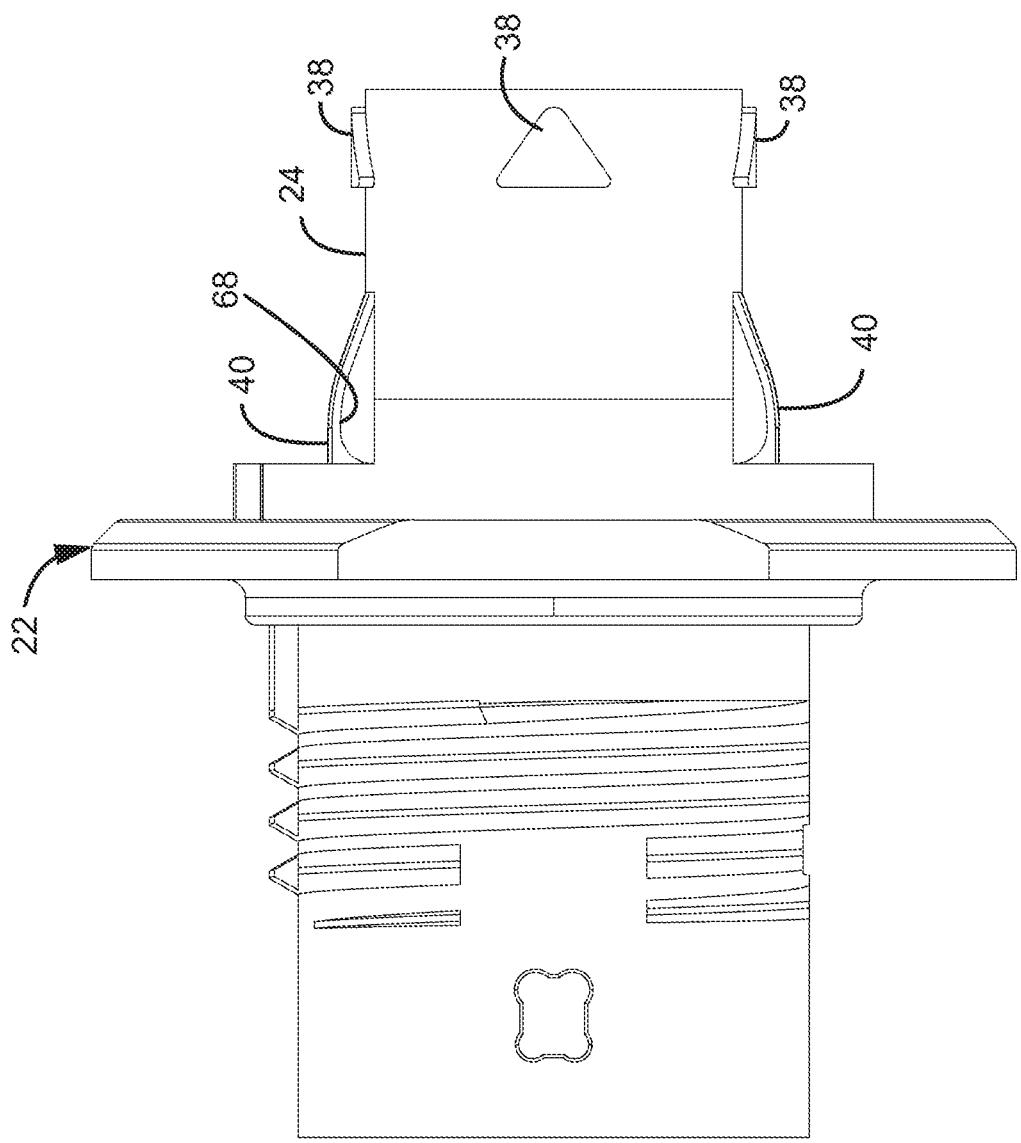
FIG. 12 is another side view of the fiber optic adapter of FIG. 10.

Referring to FIGS. 10 and 14, the rotational securement latches 40 on the outer adapter body 24 each are formed by a flexible beam 62 having first and second opposite ends 64, 66 that are integrally formed and fixed with respect to the main body of the outer adapter body 24. An open space or region 68 is defined between each of the flexible beams 62 and the main body of the outer adapter body 24 for providing space that allows the flexible beams 62 to flex radially inwardly relative to the adapter axis 30 when contacted by corresponding ramp surfaces 46 of one of the rotational securement catches 44. The flexible beams 62 each include a rotational stop surface 70 that faces in a first rotational direction 72 and a ramp engagement surface 74 that faces in a second rotational direction 76 opposite from the first rotational direction 72. When the retaining sleeve 26 and the outer adapter body 24 are rotated relative to one another between the first rotational state and the second rotational state, the ramp surfaces 46 of the rotational securement catches 44 engage the ramp engagement surfaces 74 of the flexible beams 62 thereby causing the flexible beams 62 to flex radially inwardly to permit the rotational securement catches 44 to move past the flexible beams 62. Once the rotational securement catches 44 move past the flexible beams 62, the flexible beams 62 resiliently return to their non-deflected state such that the rotational stop surfaces 70 oppose the rotational stop surfaces 48 of the corresponding securement catches 48. The rotational stop surfaces 48 of the securement catches 44 face in the second rotational direction 76.

In certain examples, engagement between the rotational stop surfaces 70 and the rotational stop surfaces 48 resist the retaining sleeve 26 from being rotated relative to the outer adapter body 24 from the second rotational state back to the first rotational state. In certain examples, engagement of the stop surfaces 70, 48 is sufficiently robust that the flexible beams 62 are required to be damaged or broken in order for the retaining sleeve 26 to be moved from the second rotational position back to the first rotational position. Thus, in such situations, to move the retaining sleeve 26 from the second rotational position back to the first rotational position, sufficient torque must be applied to the retaining sleeve 26 to cause the flexible beams 62 to break. In certain examples, the flexible beams 62 can be designed to control the amount of force required to break the flexible beams 62. For example, by altering the thickness of the flexible beams 62 or by providing regions in the flexible beams having reduced strength (e.g., notched regions, partially cut regions, etc.), the force required to break the flexible beams 62 can be customized for different applications (e.g., see FIGS. 22 and 23). In certain examples, damage to the flexible beams 62 can be used as a visible indicator that the retaining sleeve 26 has been moved from the second rotational position back to the first rotational position. The flexible beams 62 can thus function as tampering indicators.

Referring still to FIGS. 10 and 14, the first stop arrangement 34 includes axial stop surfaces 54 that face in a first axial direction 58 along the adapter axis 30, and stop surfaces 55 that face in a second axial direction 60 along the adapter axis 30. The first and second axial directions 58, 60 are opposite from one another. The first stop arrangement 34 also includes rotational stop surfaces 57 that face in the second rotational direction 76. The axial stop surfaces 54 are defined by corners of the first triangular projections 38, the axial stop surfaces 55 are defined by sides of the first triangular projections 38 that are opposite from the corners defining the stop surfaces 54, and the rotational stop surfaces 57 are defined by sides of the first triangular projections 38 that extend between the axial stop surfaces 54, 55. It will be appreciated that the first stop arrangement 34 is defined in part by the first triangular projections 38 and in part by the rotational securement latches 40.

It will be appreciated that the second stop arrangement 36 is defined in part by the recesses 42 and in part by the rotational securement catches 44 within the interior of the retaining sleeve 26. For example, referring to FIG. 9, the rotational securement catches 44 define the rotational stop surfaces 48 that face in the second rotational direction 76. Also, the triangular recesses 42 include axial stop surfaces 56 that face in the second axial direction 60, axial stop surfaces 59 that face in the first axial direction 58 and rotational stop surfaces 61 that face in the first rotational direction 72. The recesses 42 include triangular portions 63 shaped to compliment the shape of the triangular projections 38. Access gaps 52 are tapered to facilitate guiding the triangular projections 38 into the recesses 42 as the retaining sleeve 26 and the outer adapter body 24 are axially inserted together.

As used herein, a surface "faces in a direction" if the surface faces at least partially in the direction.

Figure 15:
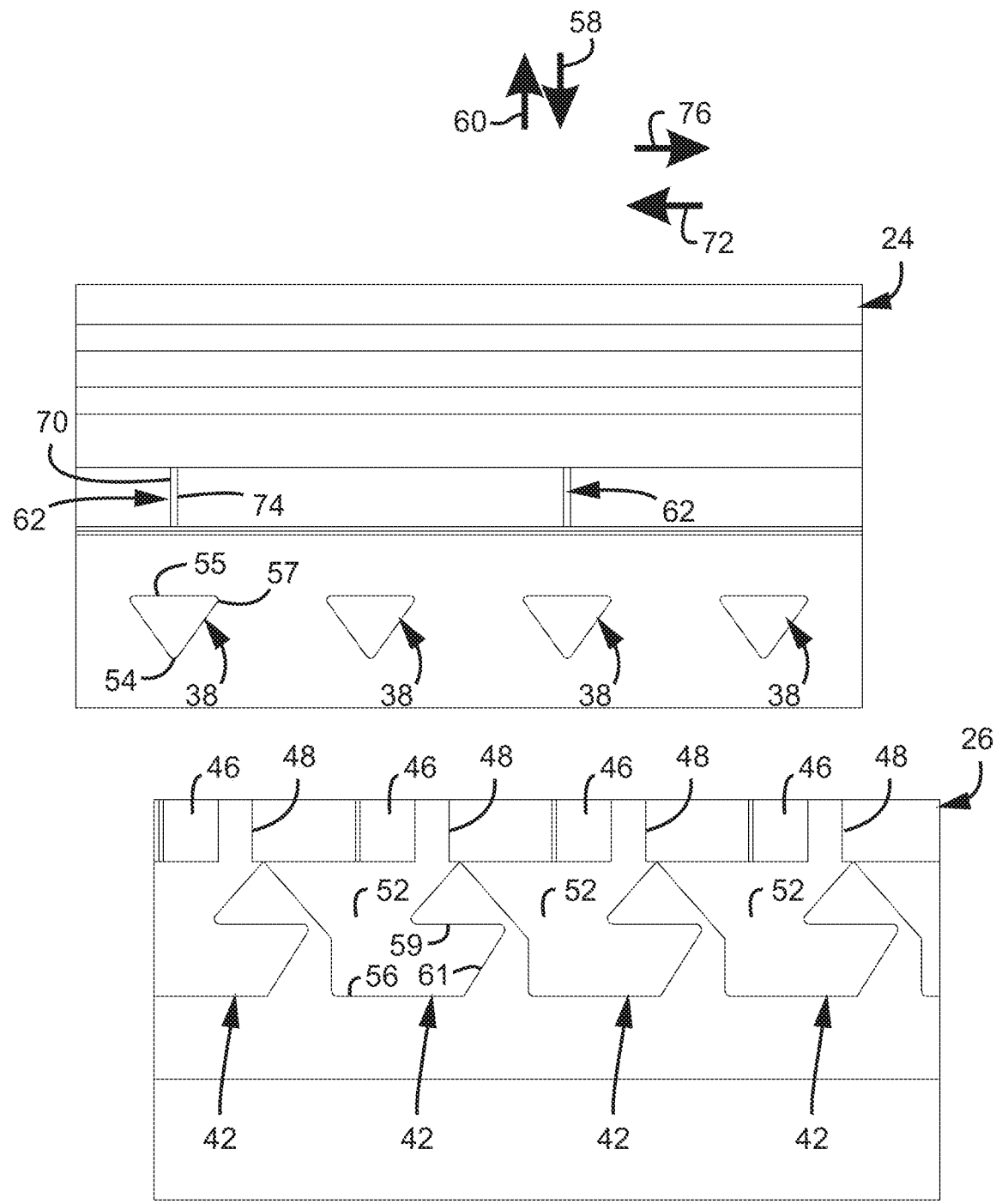
FIG. 15 is a diagrammatic, laid flat view showing the turn-to-secure interface of the fiber optic connector and fiber optic adapter of FIGS. 1-3 prior to the interface being axially inserted together.

FIG. 15 shows the retaining sleeve 26 axially aligned with the outer adapter body 24 prior to axial insertion between the outer adapter body 24 and the retaining sleeve 26. As so positioned, the triangular projections 38 on the outer adapter body 24 align with the gaps 52 that provide access to the recesses 42 within the interior of the retaining sleeve 26. When the retaining sleeve 26 and the outer adapter body 24 are axially inserted together, the taper of the triangular projections 38 as well as the tapered configuration of the access gaps 52 facilitates guiding the triangular projections 38 into the recesses 42.

Figure 16:
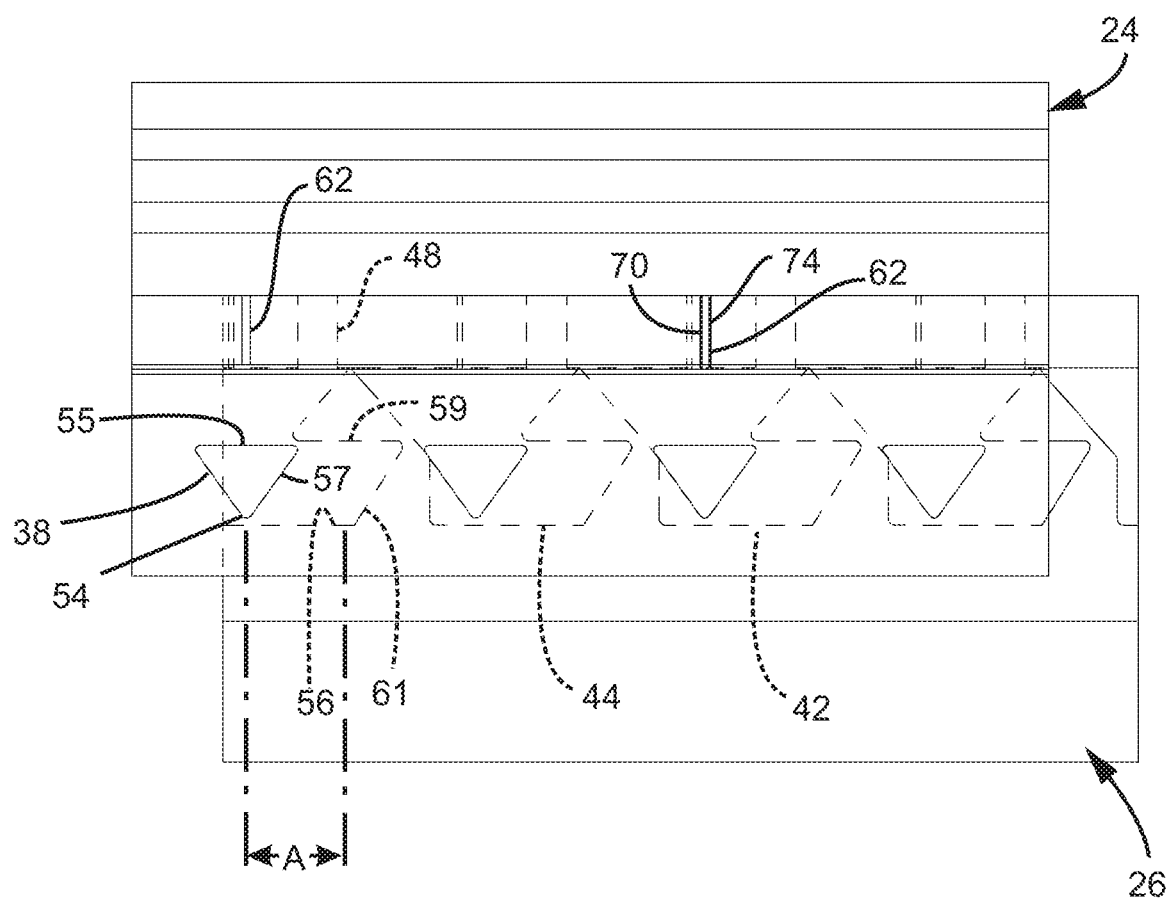
FIG. 16 shows the turn-to-secure interface of FIG. 15 with the retention sleeve of the fiber optic connector and the adapter body of the fiber optic adapter inserted together in a first rotational state.

FIG. 16 shows the retaining sleeve 26 and the outer adapter body 24 axially inserted together, with the outer adapter body 24 and the retaining sleeve 26 in the first rotational state. In the first rotational state, the stop surfaces 54 of the outer adapter body 24 oppose or engage the corresponding stop surfaces 56 of the retaining sleeve 26 to limit the depth of axial insertion that can take place between the retaining sleeve 26 and the outer adapter body 24. Also, the axial stop surfaces 55 of the first stop arrangement 34 are rotationally offset from the axial stop surfaces 59 of the second stop arrangement 36 such that no interference is provided between the stop surfaces 55, 59 that would prevent the outer adapter body 24 and the retaining sleeve 26 from being axially separated from one another. Thus, in the first rotational state of FIG. 16, the outer adapter body 24 and the retaining sleeve 26 can be axially separated from one another. Additionally, the rotational stop surfaces 57 of the first stop arrangement 34 are rotationally offset from the rotational stop surfaces 61 of the second stop arrangement 36 by a rotation angle A. In certain examples, the rotational angle A is no more than about 90 degrees. In one example, the rotation angle A is about 90 degrees which corresponds generally to a quarter turn of the retaining sleeve 26 relative to the outer adapter body 24. In one example, the rotation angle A is about 45 degrees.

Figure 17:
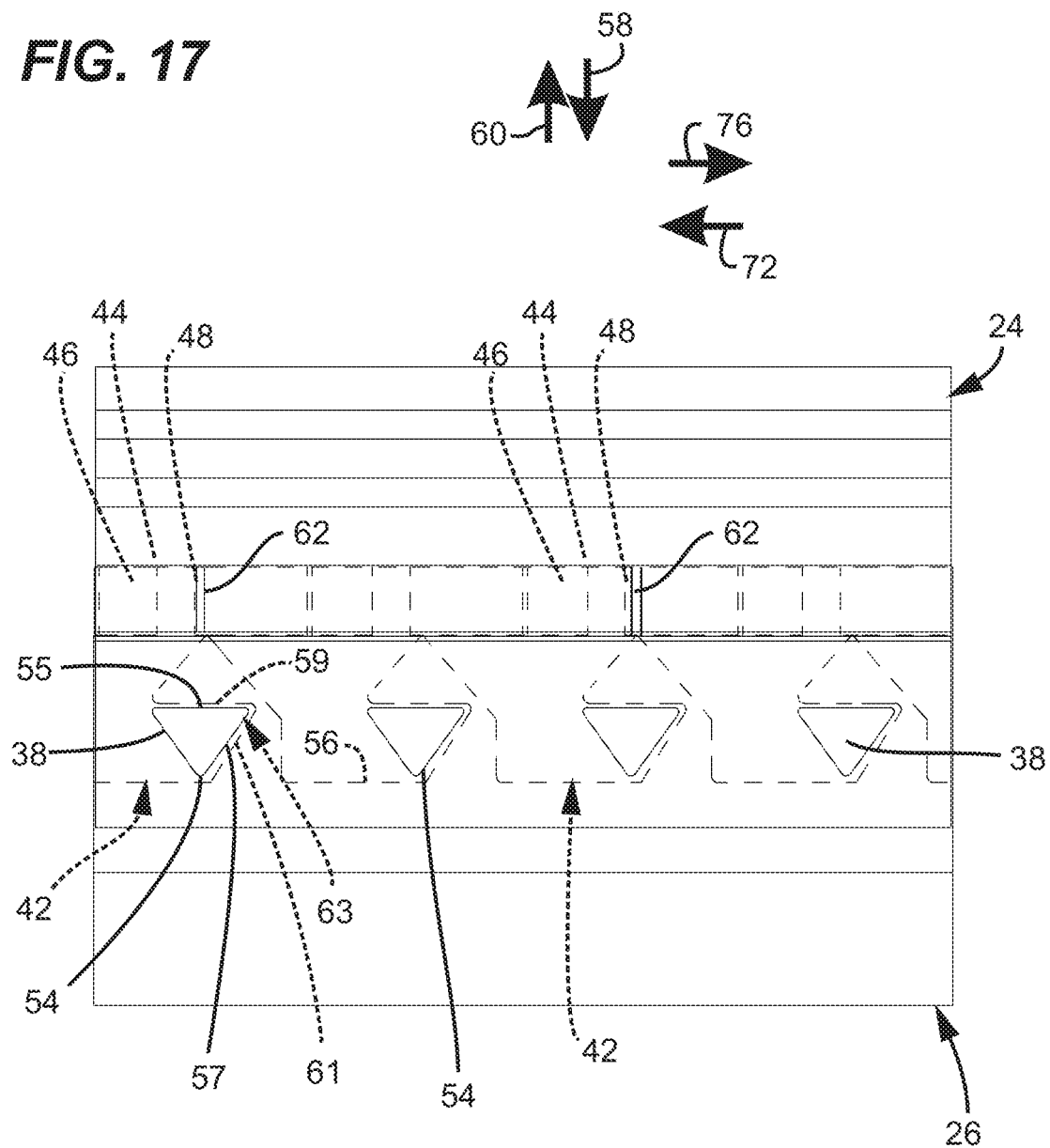
FIG. 17 shows the turn-to-secure connection interface of FIGS. 15 and 16 turned to a second rotational state.

FIG. 17 shows the outer adapter body 24 and the retaining sleeve 26 in the second rotational state. To move the outer adapter body 24 and the retaining sleeve 26 from the first rotational state to the second rotational state, the retaining sleeve 26 can be rotated in the first direction 72 relative to the outer adapter body 24 through the angle A. When the retaining sleeve 26 is rotated from the first rotational state to the second rotational state, the triangular projections 38 are received within the triangular portions 63 of the recesses 42 of the retaining sleeve 26 as shown at FIG. 17. As so positioned, the stop surfaces 54 of the first stop arrangement 34 continue to oppose the stop surfaces 56 of the second stop arrangement 38. Also, the stop surfaces 55 of the first stop arrangement 34 oppose the stop surfaces 59 of the second stop arrangement 36 such that interference between the stop surfaces 55, 59 prevents the retaining sleeve 26 and the outer adapter body 24 from being axially separated from one another. Further, the rotational stop surfaces 57 of the first stop arrangement 34 oppose and are adjacent to the rotational stop surfaces 61 of the second stop arrangement 36 to limit the range of rotational movement that is possible between the retaining sleeve 26 and the outer adapter body 24 as the retaining sleeve 26 is rotated between the first and second rotational states.

When the retaining sleeve 26 is in the second rotational state, the rotational stop surfaces 48 of the rotational securement catches 44 oppose the rotational stop surfaces 70 of the rotational securement latches 40. In this way, the stop surfaces 70, 48 resist rotation of the retaining sleeve 26 from the second rotational position back to the first rotational position. As the retaining sleeve 26 is rotated from the first rotational position to the second rotational position, the ramp engagement surfaces 74 of the rotational securement latches 40 are engaged by the ramp surfaces 46 of the rotational securement catches 44 causing the rotational securement latches 40 to resiliently flex from a securement position to a clearance position to allow the rotational securement catches 44 to move rotationally past the rotational securement latches 40. The rotational securement latches 40 elastically return to their securement positions after the rotational securement catches have moved past the rotational securement latches 40. Once the rotational securement latches 40 move back to the securement positions, the rotational stop surfaces 70 of the rotational securement latches 40 oppose the rotational stop surfaces 48 of the rotational securement catches 44 to resist rotation of the retaining sleeve 26 from the second rotational state back to the first rotational state.

In the depicted example, the rotational stop surfaces 48 of the rotational securement catches 44 and the rotational stop surfaces 70 of the rotational securement latches 40 are arranged generally perpendicular to the direction of rotation 76 required to move the retaining sleeve 26 from the second rotational position back to the first rotational position. Thus, it generally would be required to break the rotational securement latches 40 in order to move the retaining sleeve 26 from the second rotational state back to the first rotational state. In other examples, the rotational stop surfaces 48 and/or the rotational stop surfaces 70 may be angled relative to the direction of rotation 76 such that the surfaces resist moving the retaining sleeve 26 from the first rotational state to the second rotational state, but will cause the rotational securement latches 40 to flex radially inwardly to allow the retaining sleeve 26 to be moved from the first rotational state to the second rotational state if sufficient torque is applied to the retaining sleeve 26. It will be appreciated that the amount of torque required is dependent upon the selected angles of the stop surfaces. In this type of configuration, the retaining sleeve 26 can be moved from the first rotational state to the second rotational state without breaking the rotational securement latches 40.

Figure 18:
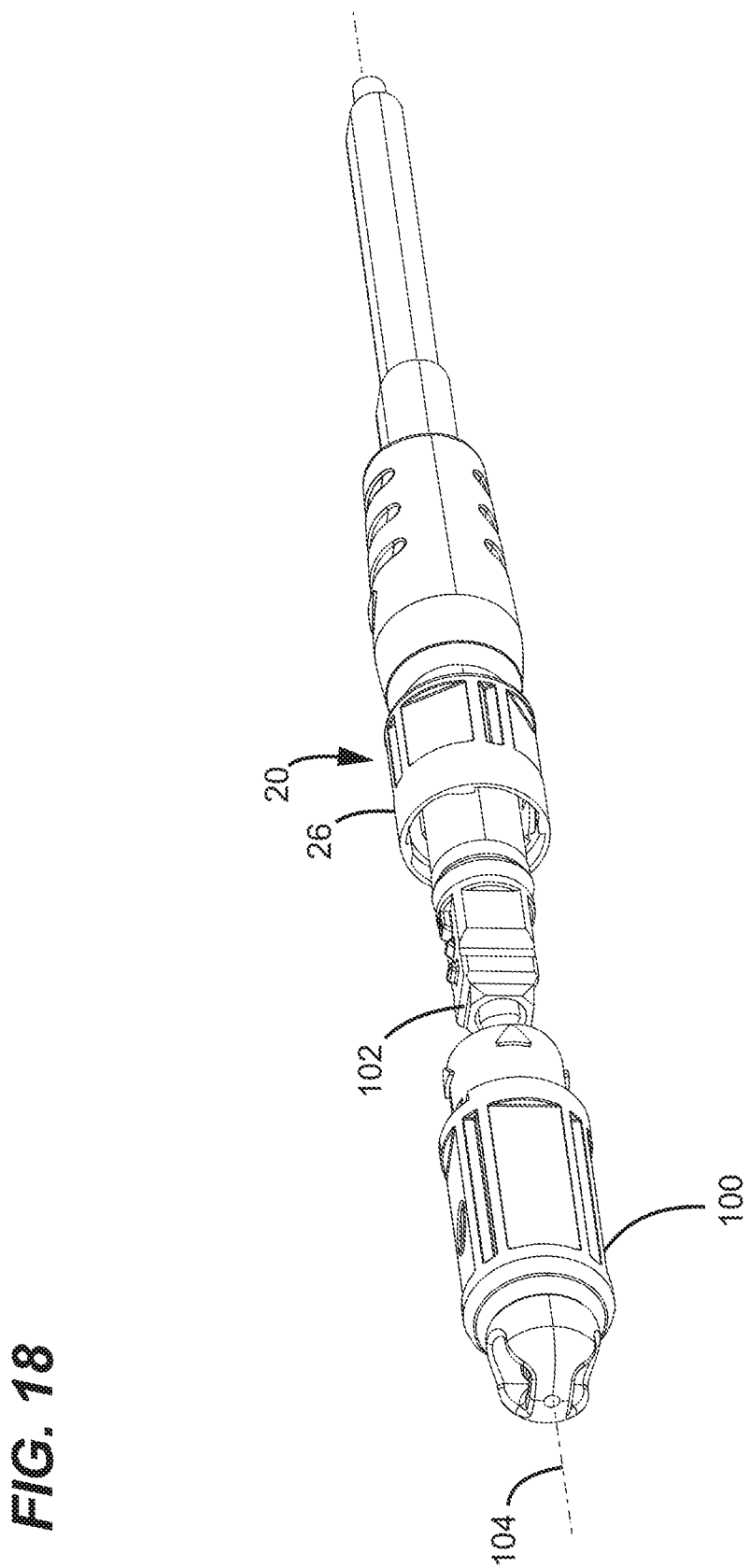
FIG. 18 is a perspective view depicting the fiber optic connector of FIGS. 1-3 shown aligned with a corresponding dust cap.
Figure 19:
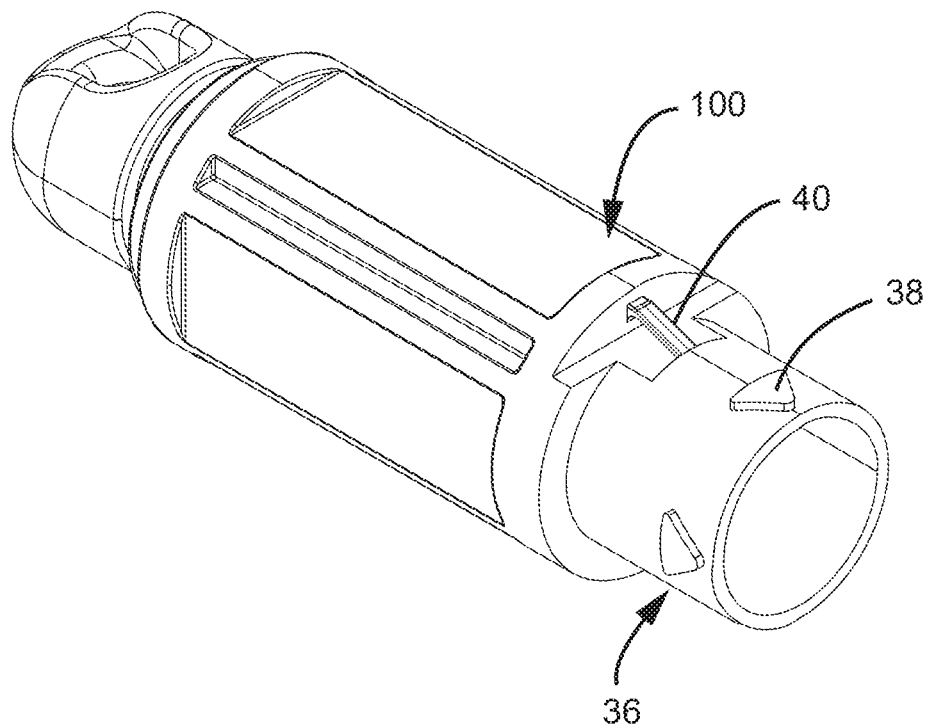
FIG. 19 is a perspective view of the dust cap of FIG. 18.
Figure 20:
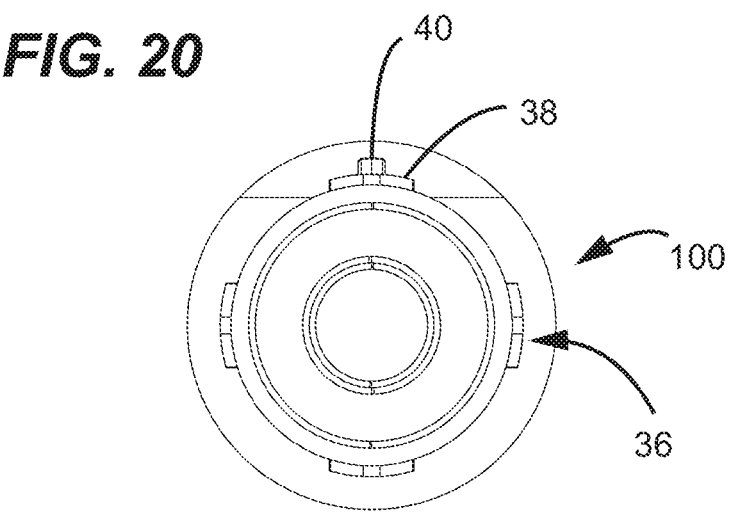
FIG. 20 is an end view of the dust cap of FIG. 19.
Figure 21:
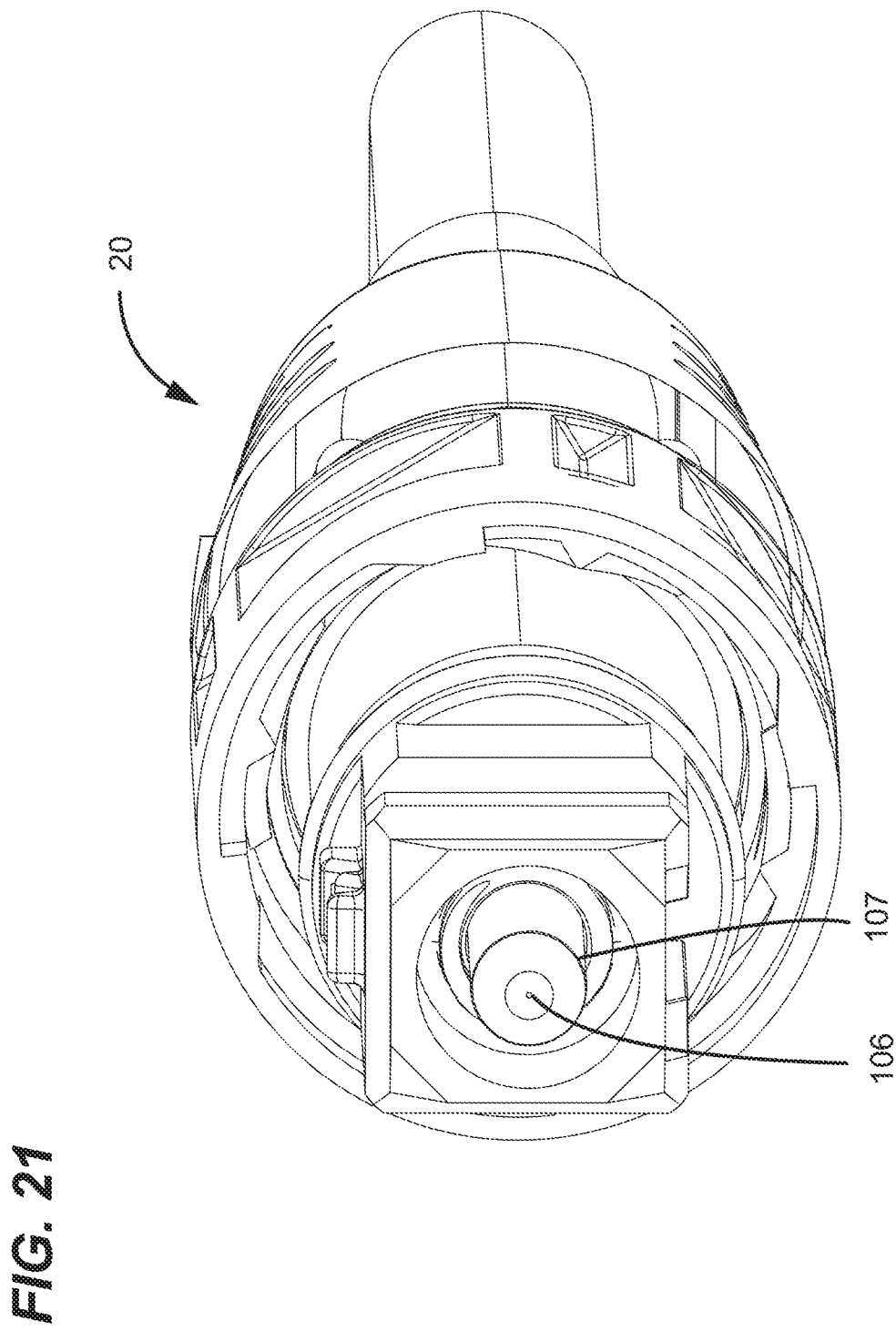
FIG. 21 is an end view of the fiber optic connector of FIGS. 1-3 and 18.

FIG. 18 shows the fiber optic connector 20 aligned with a corresponding dust cap 100. The fiber optic connector has a connector end 102. The fiber optic connector defines an axis 104. The fiber optic connector 20 supports an optical fiber 106 which has a fiber end adjacent the connector end 102. In the depicted example, the optical fiber 106 is supported within a ferrule 107. In other examples, ferruleless connectors may be used. The retaining sleeve 26 is rotatably mounted on the connector body 28. The dust cap 100 includes the first stop arrangement 36. The cap 100 mounts over the connector end 102 for protecting the end of the optical fiber 106. The cap 100 is secured to the fiber optic connector 20 by the retaining sleeve 26. The retaining sleeve 26 and the cap 100 are axially insertable together and when inserted together are rotatable relative to one another between a first rotational state and a second rotational state in the same manner described with respect to the relationship between the retaining sleeve 26 and the outer adapter body 24. The cap 100 is axially removable from the connector 20 when the retaining sleeve 26 and the cap 100 are in the first rotational state. The cap 100 is not axially removable from the fiber optic connector 20 when the retaining sleeve 26 and the cap 100 are in the second rotational state due to interference between the first and second stop arrangements 34, 36.

The snap-fit arrangement provided as part of the first and second stop arrangements 34, 36 is configured for retaining the cap 100 and the retaining sleeve 26 in the second rotational state. In certain examples, the snap-fit arrangement is required to be damaged to move the retaining sleeve 26 and the cap 100 from the second rotational state back to the first rotational state. In this way, the snap-fit interface can function as a tampering indicator. For example, once the fiber optic connector 20 has been processed and cleaned in the factory, the cap 100 can be factory installed on the fiber optic connector 20 by interlocking the dust cap 100 with the retaining sleeve 26. Preferably, the dust cap 100 is not removed prior to the fiber optic connector being used in the field. Therefore, when the fiber optic connector is ready to be used in the field, the field technician will rotate the outer adapter body 24 and the retaining sleeve 26 from the second rotational position back to the first rotational position thereby breaking the snap-fit arrangement. If the snap-fit arrangement has already been broken, the field technician will have notice that the fiber optic connector may have been compromised.

As used herein, the first rotational state can be referred to as a non-coupled rotational state and the second rotational state can be referred to as a coupled rotational state. In the non-coupled rotational state, the first and second stop arrangements 34, 36 do not interlock such that the two connectable parts (e.g. the adapter body 24 and the retaining sleeve 26) can be axially separated from one another. In contrast, in the coupled rotational state, the stops of the two components that are being coupled together to overlap one another and to prevent the two components from being disengaged in an axial direction. Further, in the coupled rotational position, snap-fit structures of the components are preferably also interlocked to inhibit the components from being rotated from the coupled rotational state back to the non-coupled rotational state. In certain examples, the snap-fit arrangement can include a detent that can be overcome when sufficient torque is applied between the components to disengage the snap-fit connection. In certain examples, the detent configuration is reusable and is designed not to break when the components are moved from the coupled rotational position back to the non-coupled rotational position. In other examples, the snap-fit configuration can be adapted as a single-use connection, and is required to be broken to move the coupled components from the coupled rotational position back to the non-coupled rotational position. In other examples, the snap-fit configuration can include a latch capable of being manually moved (e.g., depressed) from a retaining position to a release position to allow the coupled components to be moved from the coupled rotational position back to the non-coupled rotational position. In such an example, the latch may include a portion that is positioned outside the coupled components (e.g., outside the retaining sleeve 26) that can be accessed to move the latch to the release position in which the latch does not obstruct rotational movement of the components from the coupled rotational position back to the non-coupled rotational position.

In certain examples, once the two components are fully axially inserted together, the components can be rotated from the non-coupled rotational state to the coupled rotational state without utilizing or requiring axial movement between the components. Thus, in certain examples, the snap-fit configuration for retaining the components in the coupled rotational state can be engaged without requiring axial movement between the two components being coupled together. For example, unlike a standard bayonet connection, one of the components does not need to backtrack in a withdrawal direction (e.g., a direction opposite from the insertion direction) to retain the components in the coupled rotational position. Further, in certain examples, the turn-to-secure interface as disclosed herein does not require a separate coil spring or other separate spring mechanism for applying axial spring load on either of the components being coupled together. In certain examples, the snap-fit connection for retaining the first and second components in the coupled rotational state can be engaged by pure rotational movement between the two components. Thus, in certain examples, an axial component movement is not required to engage the snap-fit connection between the components.

Figure 22:
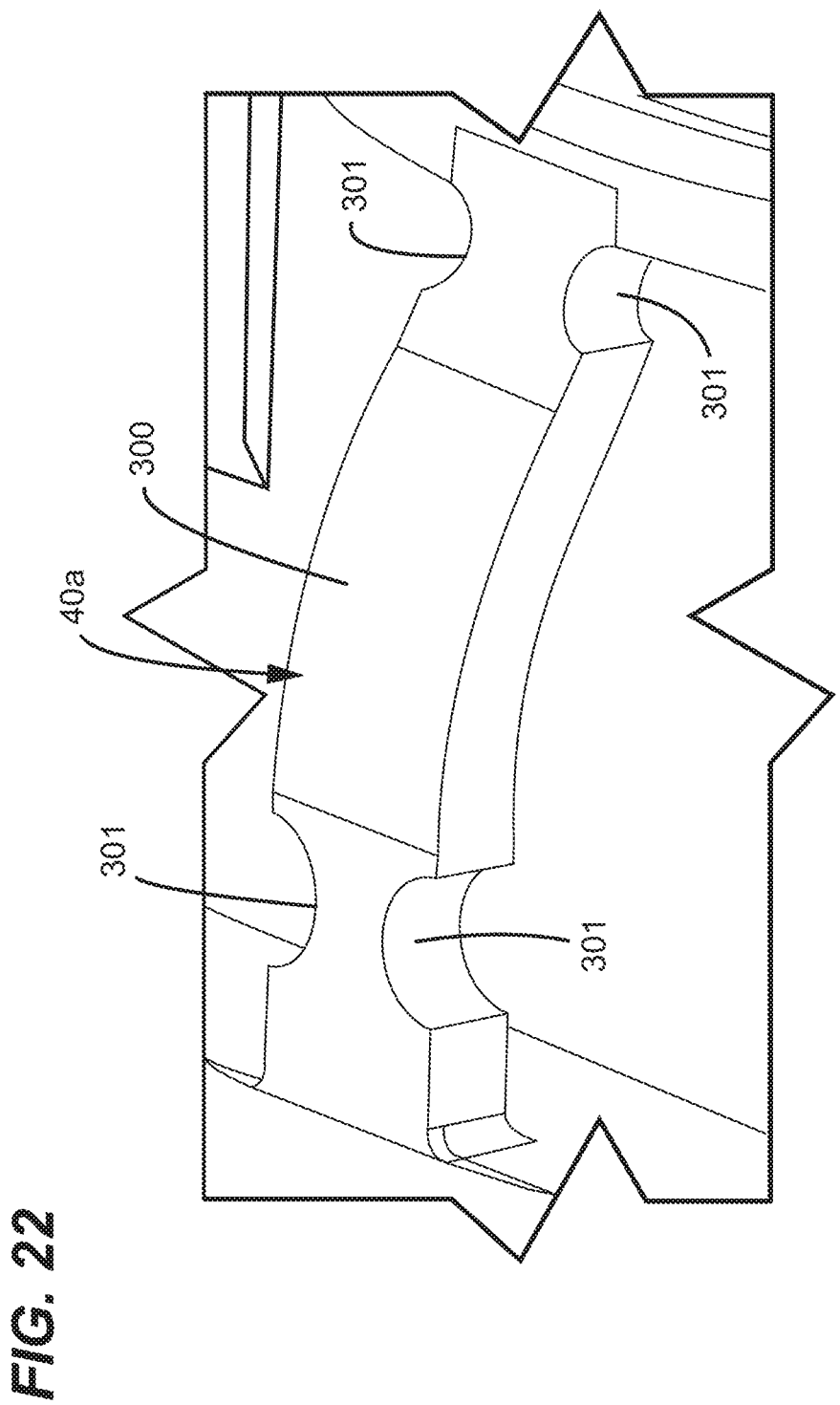
FIG. 22 depicts another snap-fit latch in accordance with the principles of the present disclosure.

FIG. 22 depicts an alternative rotational securement latch 40a in accordance with the principles of the present disclosure. The rotational securement latch 40a includes a beam 300 having opposite fixed ends. An open space is located beneath the beam 300. Notches 301 are provided at opposite sides of the beam adjacent the ends of the beam 300. The beam 300 has a length that extends in a direction transverse with respect to the rotational directional of movement of the first and second components being coupled together. Thus, the beam 300 is transverse with respect to the circumferential direction.

Figure 23:
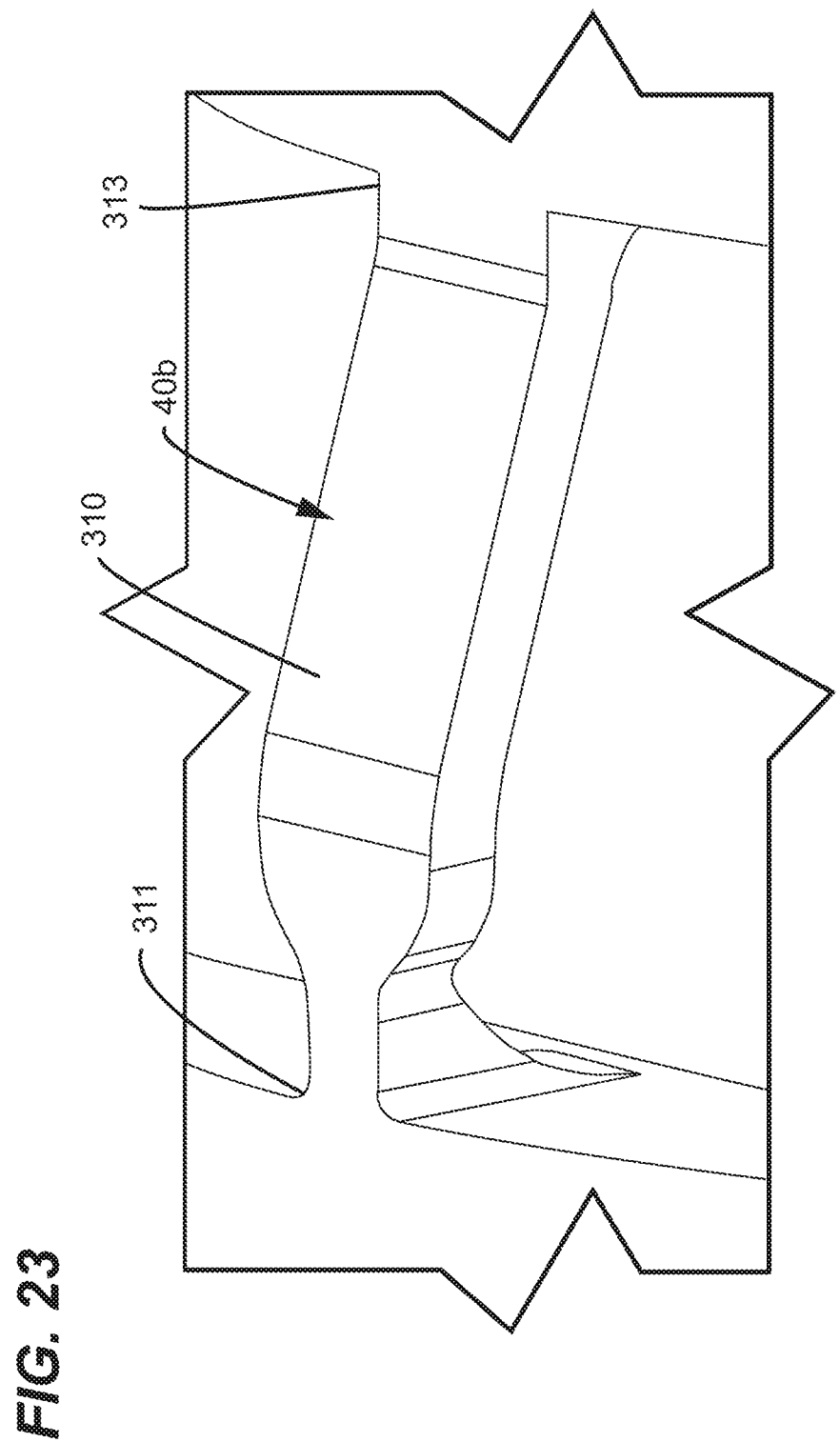
FIG. 23 depicts still another snap-fit latch in accordance with the principles of the present disclosure.

FIG. 23 shows another rotational securement latch 40b in accordance with the principles of the present disclosure. The rotational securement latch 40b also includes a beam 310 having fixed opposite ends. An attachment point 311 of one of the ends of the beam 310 has a reduced cross-sectional area as compared to the opposite end 313. Open space is located between the beam 310 and the main body of the component to which the beam is coupled. The beam 310 has a length that is transverse with respect to an orientation of rotation of the components being coupled together.

Figure 24:
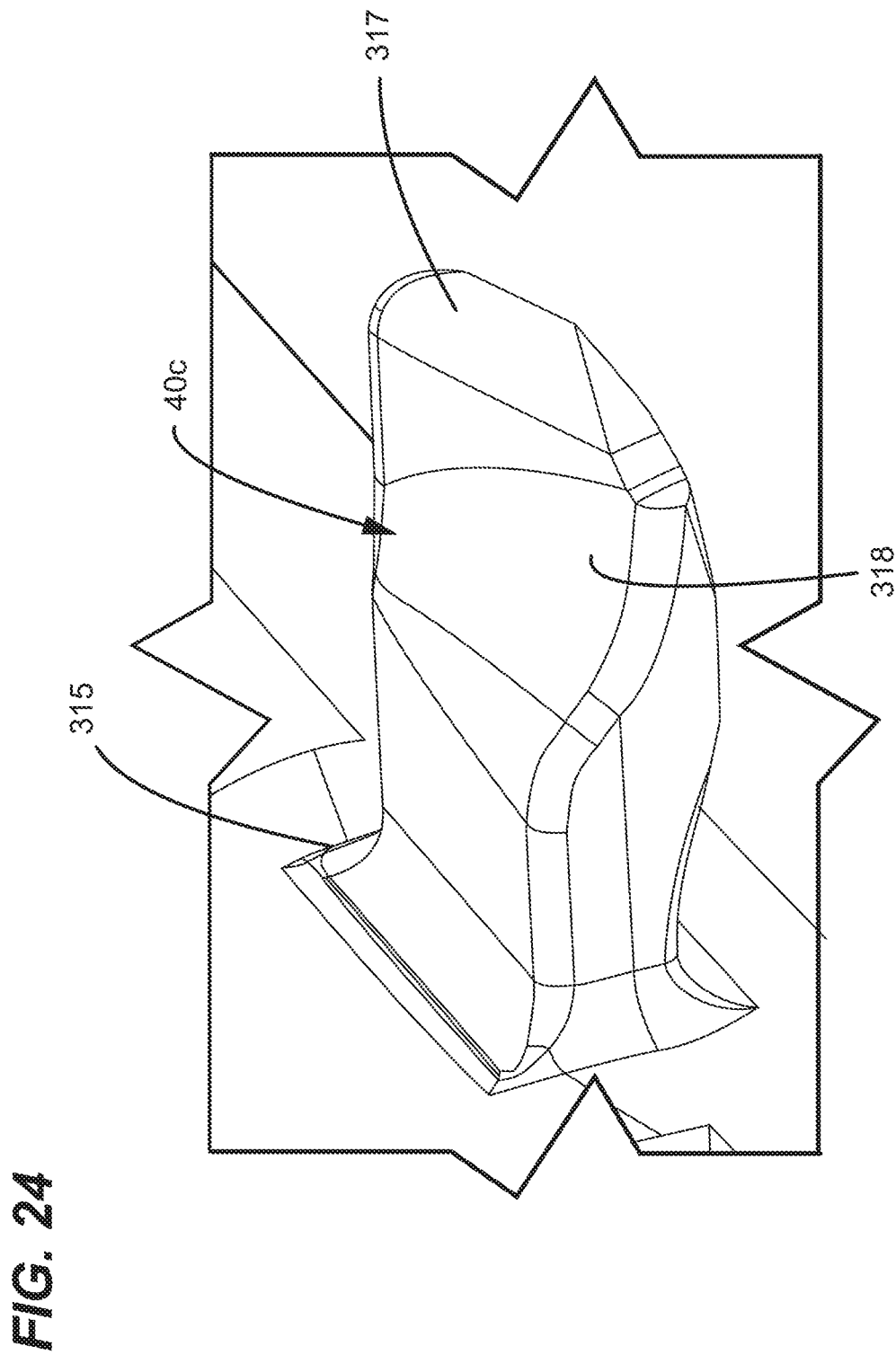
FIG. 24 depicts a cantilever type snap-fit latch in accordance with the principle of the present disclosure.

FIG. 24 depicts another rotational securement latch 40c in accordance with the principles of the present disclosure. The rotational securement latch 40c has cantilevered configuration including one end 315 integral with its corresponding component and an opposite free end 317. A portion 318 of the beam can be contoured to facilitate sliding a rotational securement catch over the beam. It will be appreciated that any of the beams 40a-40c can be used in combination with the rotational securement catches 44 previously described which are part of the second stop arrangement provided within the retaining sleeve 26. Further, all of the beams depicted in FIGS. 22-24 have major dimensions that extend transversely relative to the direction of rotation in which relative rotational movement is generated between the first and second components desired to be coupled together.

Figure 25:
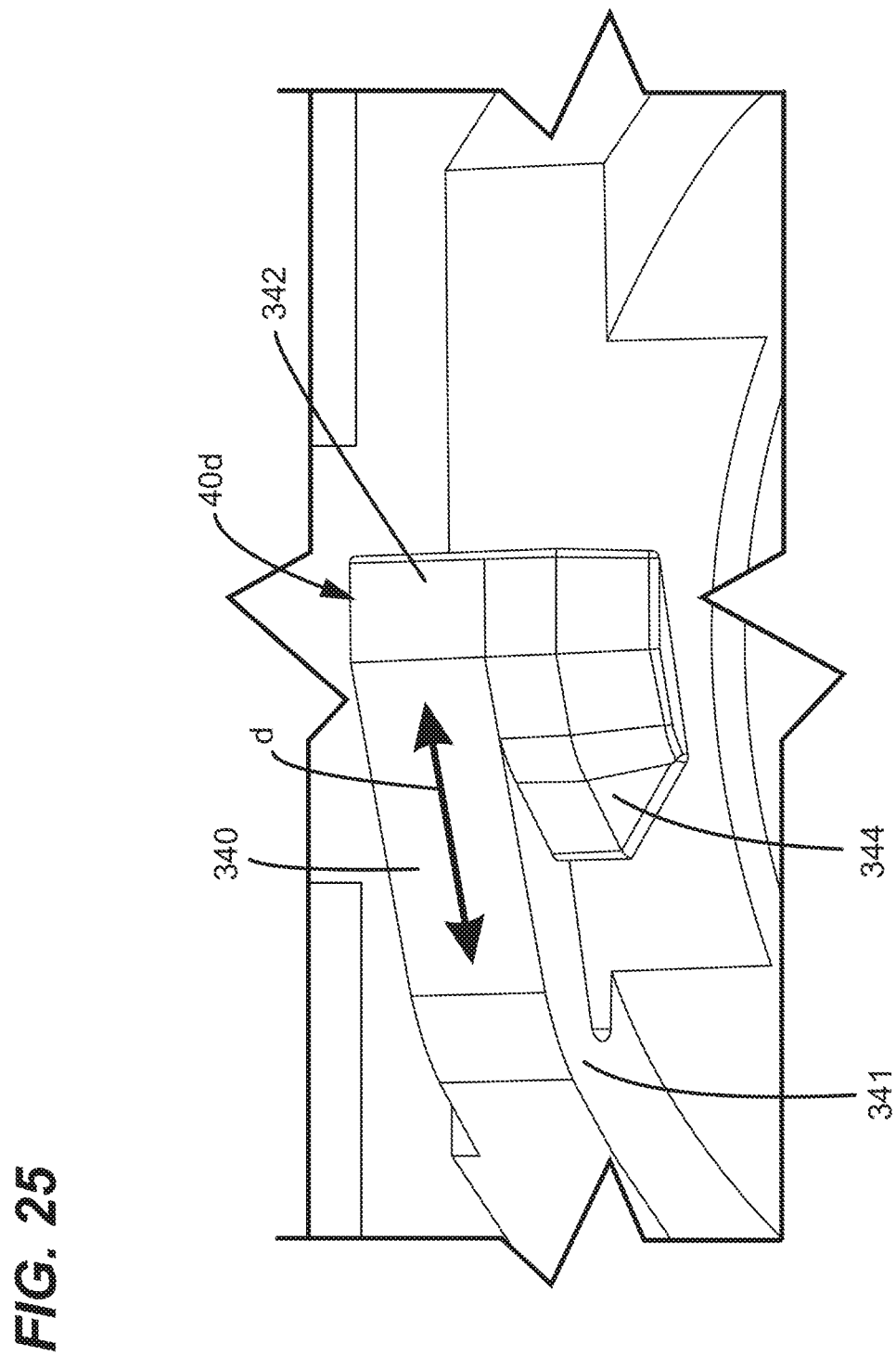
FIG. 25 depicted another cantilever type snap-fit latch in accordance with the principles of the present disclosure.
Figure 26:
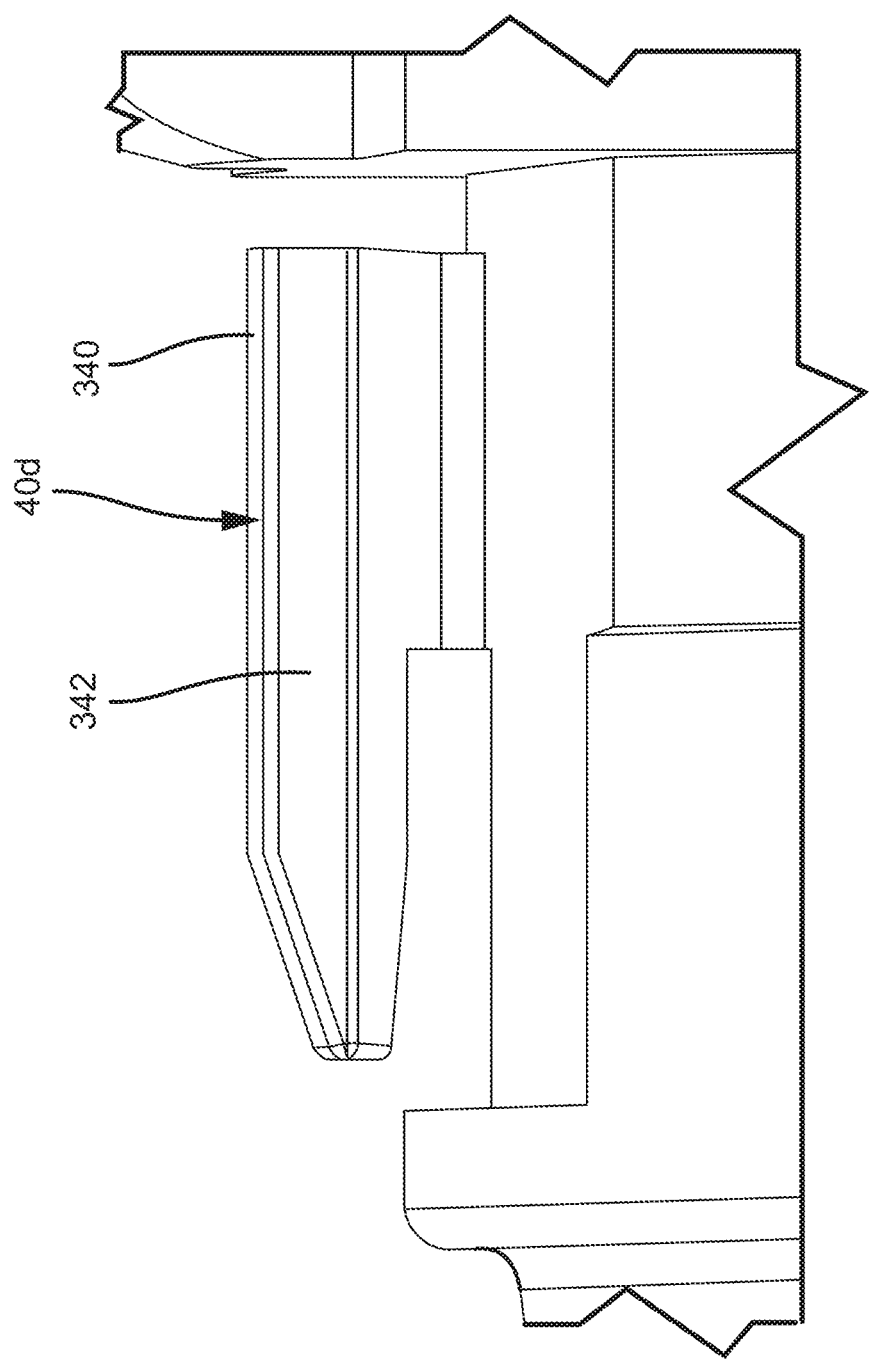
FIG. 26 is another view of the latch of FIG. 25.
Figure 27:
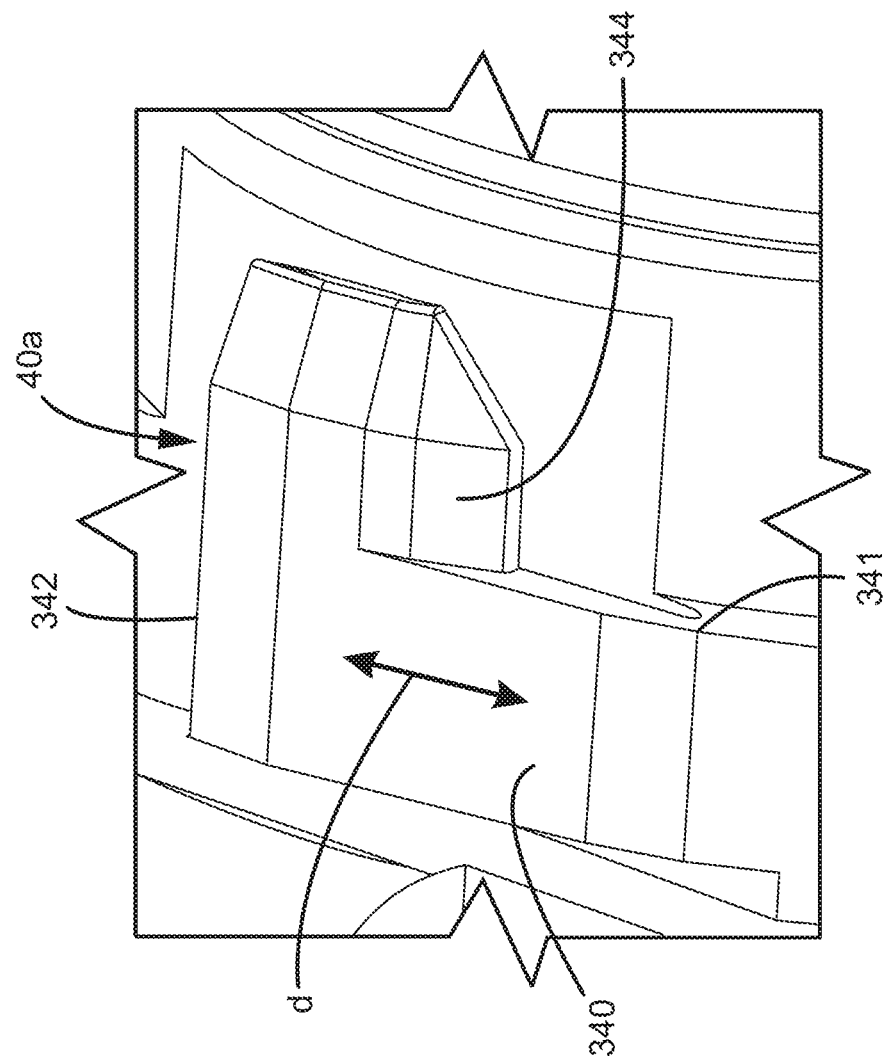
FIG. 27 is a further view of the latch of FIG. 25.

FIGS. 25-27 depict a further rotational securement latch 40d in accordance with the principles of the present disclosure. The rotational securement latch 40d can be substituted for the rotational securement latch 40 and can be incorporated as part of the first stop arrangement 34. The rotational securement latch 40d can be configured to provide a snap-fit connection with the rotational securement catches 44 of the second stop arrangement 36. Unlike the previous rotational securement latches, the rotational securement latch 40d has beam 340 with a cantilevered configuration and a length that extends in a direction d parallel to the direction of rotation in which the first and second components desired to be coupled together are rotated when the components are rotated between the non-coupled rotational position and the coupled rotational position. The beam 340 has a fixed end 341 and a free end 342. The free end 342 is circumferentially offset from the fixed end 341. A contoured ramp feature 344 is defined at a location axially offset from the primary length of the beam. The ramp feature 344 is configured for facilitating passing the rotational securement catches 44 over the rotational securement latch 40d as the components are move from the non-coupled rotational position toward the coupled rotational position. When the rotational securement catches 44 engage the contoured ramp surface, the cantilevered beams flex radially inwardly to allow the rotational securement catches 44 to pass by the latches 40d. Once the rotational securement catches 44 pass by the latches 40d and the components reach the coupled rotational state, the beams 340 elastically turn to the non-deflected state and free ends of the beams oppose the rotation securement catches 44 to prevent rotation of the components from the coupled rotational state back to the non-coupled rotational state.

It will be appreciated that the latches 40a-40d can readily be used prevent rotation of a component such as the retaining sleeve 26 from the coupled rotational state back to the non-coupled rotational state. The latch 40d is configured such that when latched with the retaining sleeve 26, a portion of the latch 40d is accessible from outside the retaining sleeve 26 to allow the latch to be manually flexed and released with respect to the retaining sleeve to allow the retaining sleeve to be rotated from the coupled rotational state back to a non-coupled rotational state. The latch 40d and other latches discloses herein can be integrated with structures such as fiber optic adapter housings, fiber optic connector housings, dust caps, connector shrouds, and the like.

Figure 28:
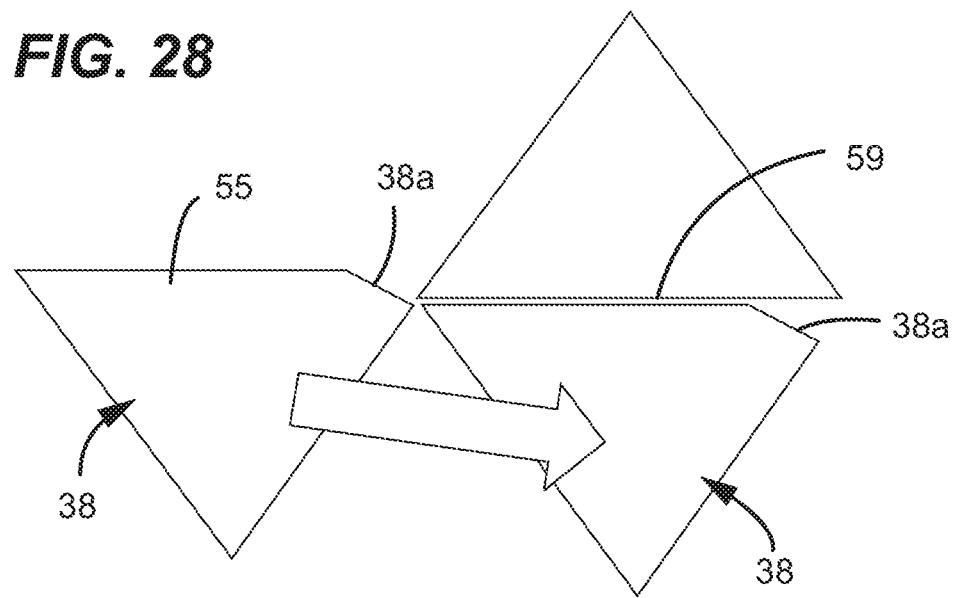
FIG. 28 depicts an example tapered lead-in for an interlock in accordance with the principles of the present disclosure.
Figure 29:
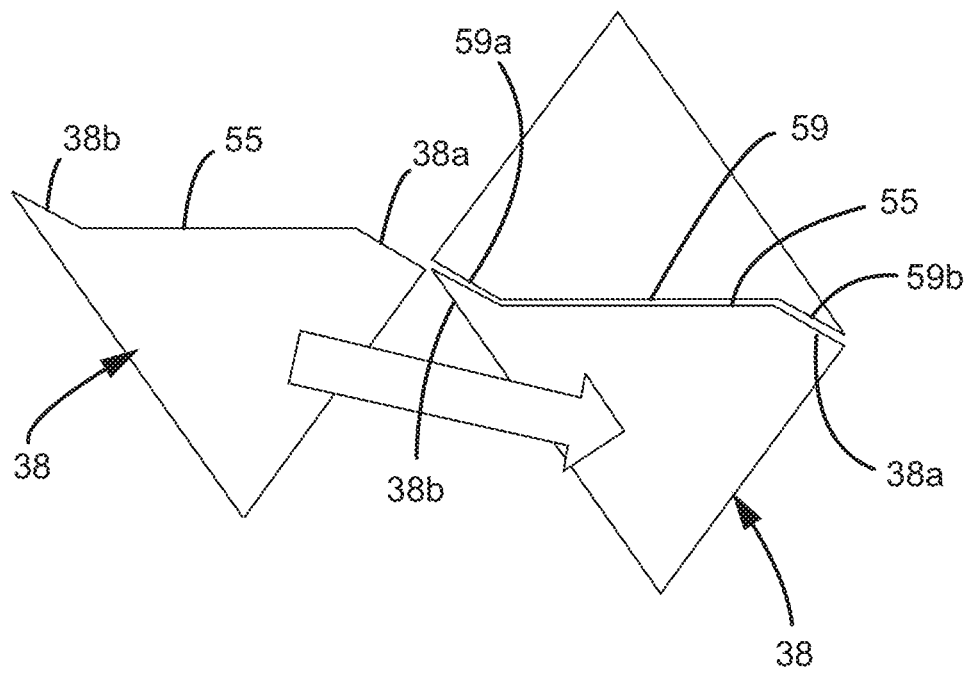
FIG. 29 depicts another example of a tapered lead-in for an interlock in accordance with the principles of the present disclosure.

FIGS. 28 and 29 show modified configurations for the second stop arrangement 36 where in each figure a modified version of stop 38 is shown moving from the non-coupled rotational state to the coupled rotational state. At FIG. 28, stop 38 has been modified with a taper or chamfer 38a to facilitate rotating the first and second components relative to one another. At FIG. 29, stop 38 has been modified with chamfer 38a and recess 42 has been modified with a taper or chamfer to facilitate rotating the first and second components relative to one another. For example, axial stop surface 59 can include angled or a chamfered lead-in portion 59a that is angled slightly relative a primary stop surface 59b. The chamfered nature of the surfaces 30a, 59a facilitates rotating the first and second components desired to be coupled together from the non-coupled rotational state to the coupled rotational state. Specifically, the two components can be rotated from the non-coupled rotational state to the coupled rotational state even if initially the two parts are not fully inserted axially to one another. In the case where the two components are not fully axially inserted together at the time rotation from the non-coupled rotational state toward the coupled rotational state is initiated, the tapered lead in surfaces 59a, 38a engage one another and force two components to the fully inserted position as rotation occurs between the first and second components. Once the first and second components are in the coupled rotational position, substantially full contact is maintained between the stop surfaces 59 and the stop surfaces 55. For example, stop surface 55 can include angled stop surface 38b that opposes surface 59a and stop surface 55 can include angled surface 59b that opposes surface 38a.

Figure 30:
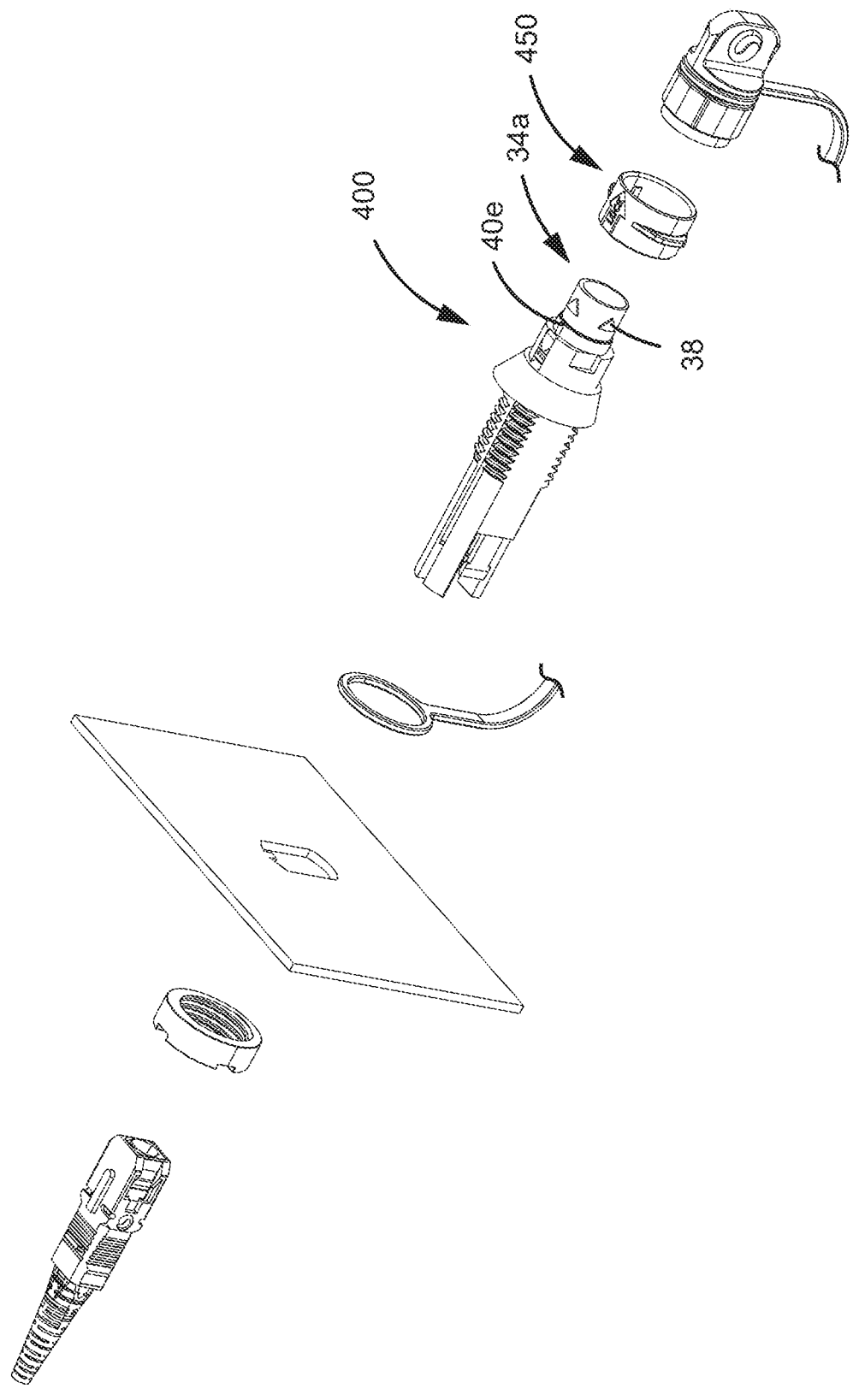
FIG. 30 depicts a fiber optic adapter including a coupling arrangement in accordance with the principles of the present disclosure that forms part of a turn-to-secure connection interface.
Figure 31:
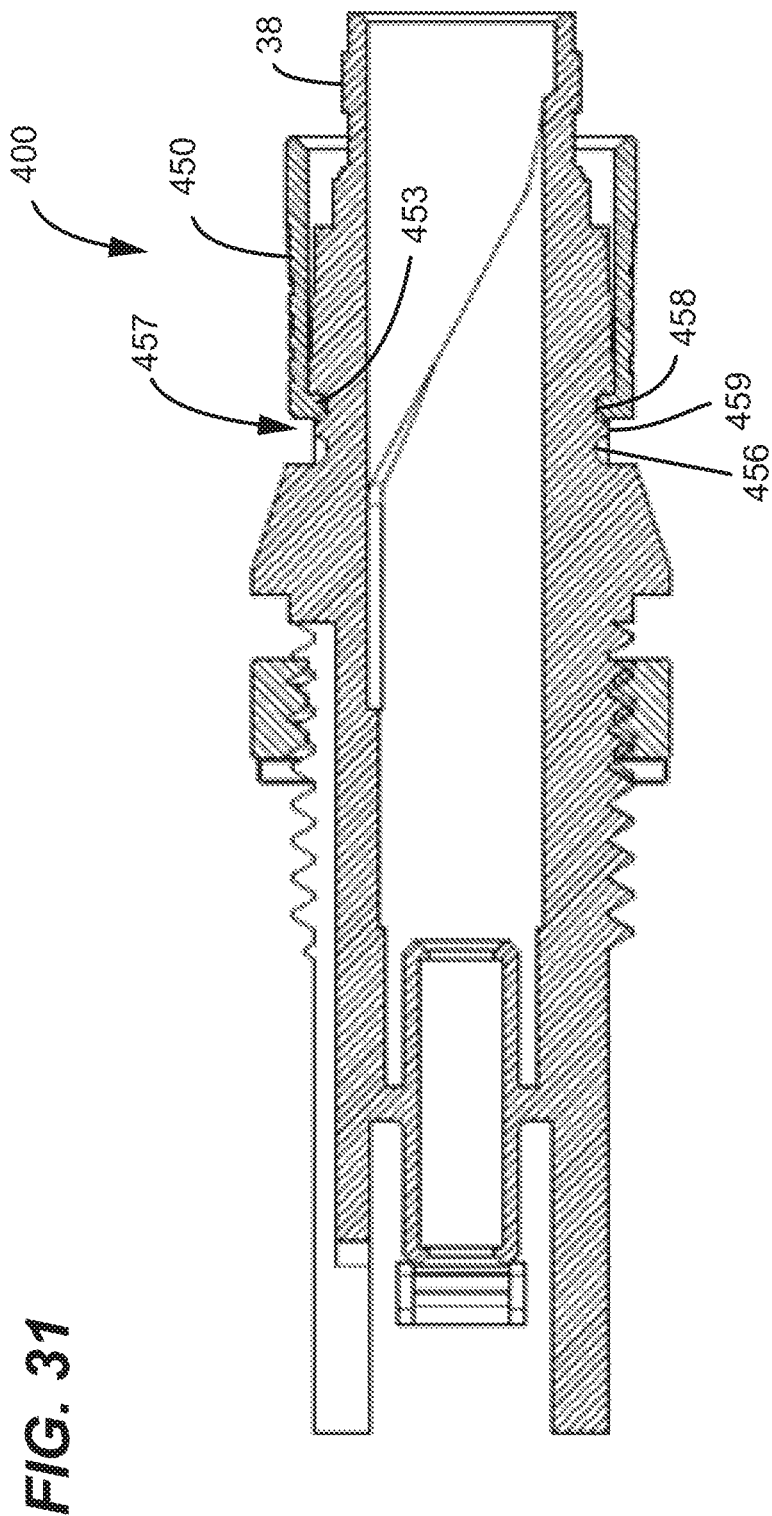
FIG. 31 is a cross-sectional view of the fiber optic adapter of FIG. 30.
Figure 32:
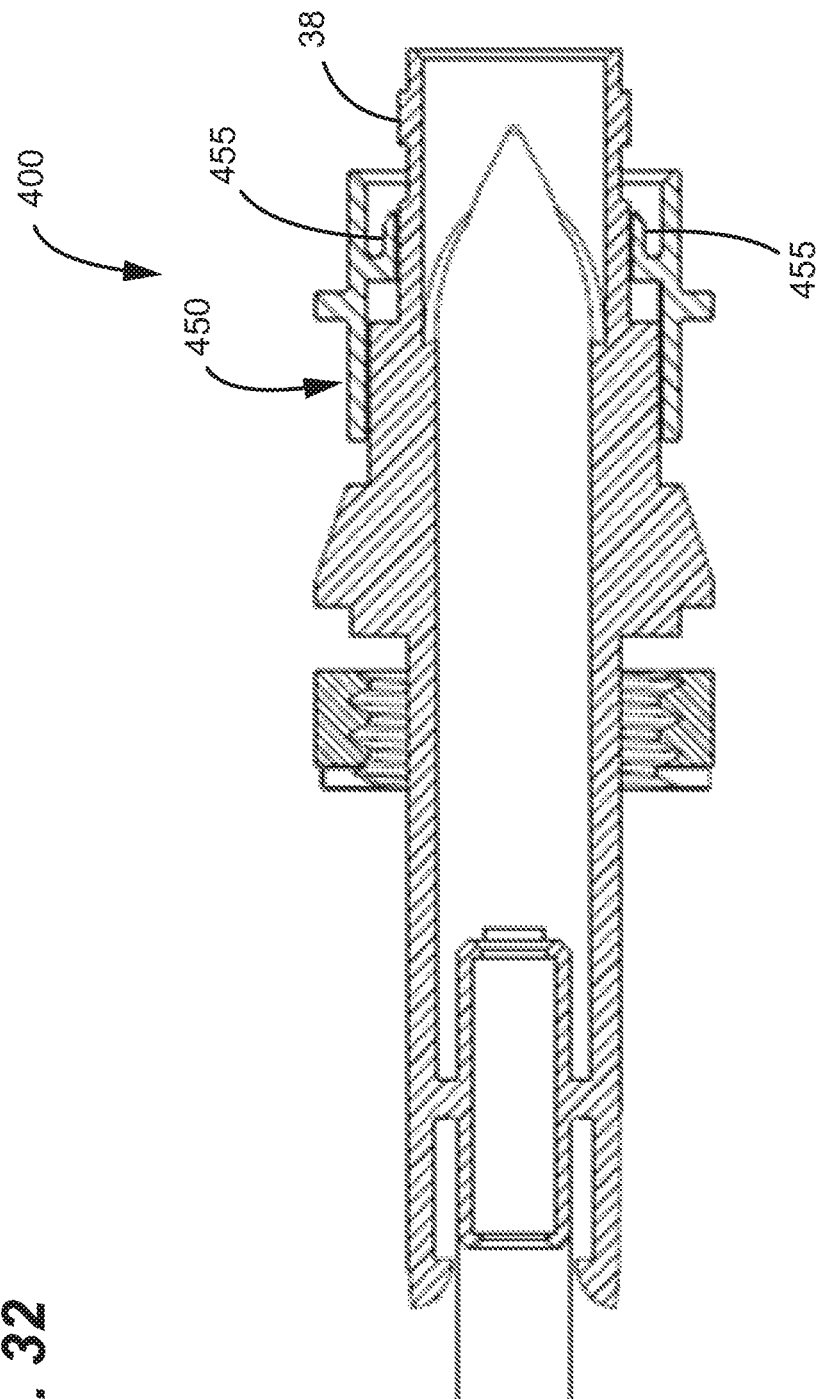
FIG. 32 is another cross-sectional view of the fiber optic adapter of FIG. 30.

FIGS. 30-32 depict another fiber optic adapter 400 in accordance with the principles of the present disclosure. The fiber optic adapter 400 includes a first stop arrangement 34a that is a modified version of the first stop arrangement 34 and that is compatible with the second stop arrangement 36. Similar to the first stop arrangement 34, the first stop arrangement 34a includes the plurality of triangular projections 38 adapted to interlock with the recesses 42 of the second stop arrangement 36 when the first and second stop arrangements are rotated relative to one another to the coupled rotational state. The first stop arrangement 34a also includes at least one snap-fit feature adapted to provide a snap-fit connection with the rotational securement catches 44 of the second stop arrangement 36 when the second stop arrangements 34a and 36 are coupled together. The snap-fit feature is depicted as including a detent 40e (e.g., a bump) adapted to engage with the corresponding one of the catches 44 when the first and second stop arrangements 34a, 36 are coupled together. In certain examples, the body (e.g., the retaining sleeve 26) carrying the second stop arrangement 36 is sufficiently flexible to enable the ramp 46 to ride over the detent 40e and the stop 48 to snap over the detent 40e. The detent 40e is configured to retain the components desired to be coupled together in the coupled rotational state, but allows for rotation from the coupled rotational state to the non-coupled rotational state if sufficient torque is applied between the components. Preferably, detent 40e does not break when the components are rotated from the coupled rotational state back to the non-coupled rotational state. Thus, the first stop arrangement 34a is adapted to be used multiple times as compared to being a single use arrangement.

Additionally, in certain implementations, the fiber optic adapter 400 includes a retention collar 450 that can be used to selectively inhibit rotation of the retaining sleeve 26 relative to the fiber optic adapter 400 from the coupled rotational state to the non-coupled rotational state. The retention collar 450 can be used to provide rotational locking of the retaining sleeve 26 with or without the detent feature 40e or other type of snap-fit feature that inhibits rotation when engaged. The retention collar 450 can be slid between a retracted position and an extended position. As will be described in more detail herein, when in the extended position, the retention collar 450 inhibits rotation of the retaining sleeve 26 relative to the adapter 400. When in the retracted position, the retention collar 450 allows rotation of the retaining sleeve 26 relative to the adapter 400.

The retention collar 450 is mounted so as to not rotate relative to the main body of the fiber optic adapter 400. For example, an internal portion of the retention collar 450 can interlock with a corresponding structure on the adapter 400 so as to prevent the retention collar 450 from rotating relative to the adapter 400 but to allow the retention collar 450 to be moved axially relative to the adapter 400 between the extended orientation and the retracted orientation. In one example, the interlock can include an axial rail that fits within an axial groove.

In certain examples, a detent arrangement 457 can be used to retain the retention collar 450 in the extended position and/or in the retracted position. In the depicted example of FIG. 31, the detent arrangement 457 includes a bump 459 disposed between first and second recesses (e.g., grooves) 456, 458 defined in the adapter 400. An inward protrusion 453 carried by the retention collar 450 snaps into the first recess 456 when disposed in the retracted position and snaps into the second recess 458 when disposed in the extended position. The inward protrusion 453 rides over the bump 459 when sufficient force is applied to the retention collar 450. Accordingly, the retention collar 450 is held in one position until the user chooses to move the retention collar 450 to the other position.

It will be appreciated that the retention collar can include internal retention members 455 (e.g., fingers) as shown in FIG. 32. The retention members 455 fit inside the retaining sleeve 26. When the retention collar 450 is moved from the retracted position to the extended position while the retaining sleeve 26 is in the coupled rotational position, the retaining members 455 oppose the rotational securement catches 44 to prevent the retaining sleeve 26 from being rotated from the coupled rotational state to the uncoupled rotational state. By moving the retention collar 450 from the extended position back to the retracted position, the retention members 455 clear the securement catches 44. Thereby the retaining sleeve 26 can be rotated from the coupled rotational state to the uncoupled rotational state. In certain examples, the retaining sleeve 26 is rotated when both the retention collar 450 is retracted and when sufficient torque is applied to the retaining sleeve 26 to overcome the detent 40e and move the retaining sleeve 26 from the coupled rotational state back to the non-coupled rotational state.

In certain examples, the retention collar 450 can be spring biased toward the extended position. In this way, the retention collar 450 can automatically move from the retracted position to the extended position once the retaining sleeve 26 is turned from the non-coupled rotational state to the coupled rotational state. To de-couple the retaining sleeve 26, the collar 450 can be manually slid from the extended position the retracted position against the bias of the spring to allow for rotation of the sleeve 26 from the coupled rotational state to the non-coupled rotational state. Insertion of the core assembly into the adapter 400 can cause movement of the collar 450 from the extended position to the retracted position (e.g., via physical contact between the retaining sleeve and the core assembly) against the bias of the spring.

Figure 33:
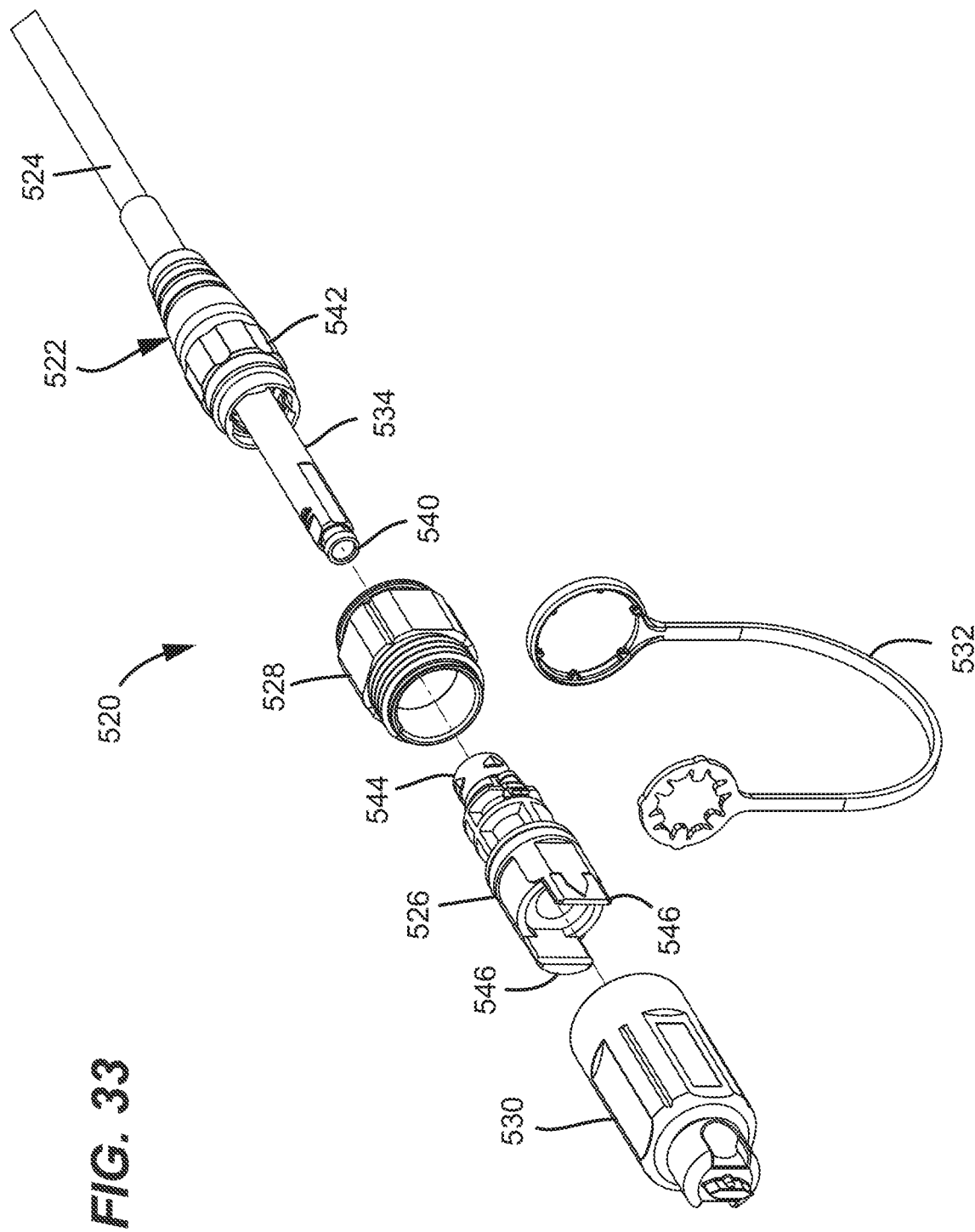
FIG. 33 is an exploded view of a fiber optic connector in accordance with the principles of the present disclosure.
Figure 34:
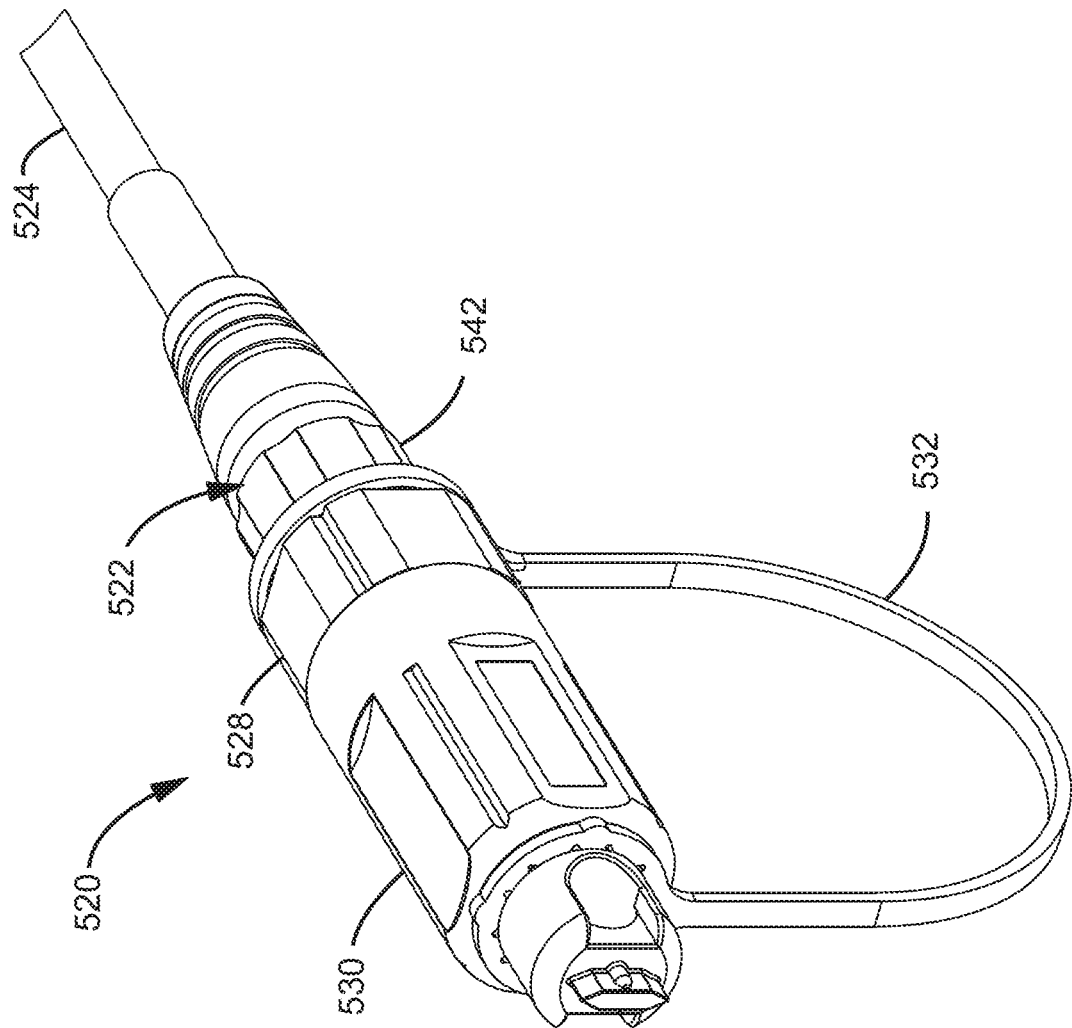
FIG. 34 is an assembled view of the fiber optic connector of FIG. 33.

FIGS. 33 and 34 depict an example fiber optic connector 520 in accordance with the principles of the present disclosure. The fiber optic connector 520 includes a core assembly 522 terminated to a fiber optic cable 524. The core assembly 522 is configured to be plugged directly into an optical adapter, such as any of the optical adapter 24, 400 disclosed herein. In certain examples, a retaining sleeve 542 carried by the core assembly 522 carries either the first stop arrangement 34 of the turn-to-secure connection interface or the second stop arrangement 36 of the turn-to-secure connection interface. The retaining sleeve 542 also may carry either part of a snap-fit arrangement (e.g., rotational securement latches 40 or the rotational securement catches 44). Accordingly, the stop arrangement 34, 36 of the retaining sleeve 542 may engage the stop arrangement 36, 34 of the adapter to secure the core assembly 522 to the adapter.

In certain implementations, the fiber optic connector 520 also is configured to receive a shroud 526 that mounts over a core 534 of the core assembly 522 and an outer fastener 528 that mounts over the shroud 526 to allow the core assembly 522 to be mounted within a different type of optical adapter, dust cap, or other mating component. The shroud carries the stop arrangement and snap-fit components that engage the corresponding stop arrangement and snap-fit components on the retaining sleeve 542 to secure the shroud to the core assembly 522. The outer fastener 528 has a connection interface arrangement adapted for mating with a corresponding connection interface arrangement integrated with a structure such as a fiber optic adapter, a dust cap or another fiber optic connector to provide mechanical connection therein between. In the depicted example, the connection interface arrangement of the outer fastener 528 is depicted as including external threads, but alternative embodiments could include a bayonet arrangement, internal threads, a stop arrangement, or other type of rotational securement arrangement. In certain implementations, the core assembly 522 may receive any of a plurality of shrouds that each have a different form factor or keying arrangement for mating with different types of adapters. In certain implementations, each shroud 526 may be coupled to any of a plurality of outer fasteners 528 that each have a different connection interface for coupling to different types of adapters.

In certain examples, the fiber optic connector 520 includes an outer dust cap 530 that couples to the outer fastener 528 and a lanyard 532 for tethering the outer dust cap 530 to the core assembly 522. In the depicted example, the outer fastener 528 includes external threads adapted to engage with internal threads of the dust cap 530 to secure the dust cap over the core of the core assembly 522. When it is desired to optically connect the fiber optic connector 520 to another fiber optic connector, either directly or through an intermediate fiber optic adapter, the outer dust cap 530 is disengaged from the outer fastener 528 thereby allowing the outer fastener 528 to be used to secure the fiber optic connector 520 to a mating fiber optic connector or fiber optic adapter.

Figure 35:
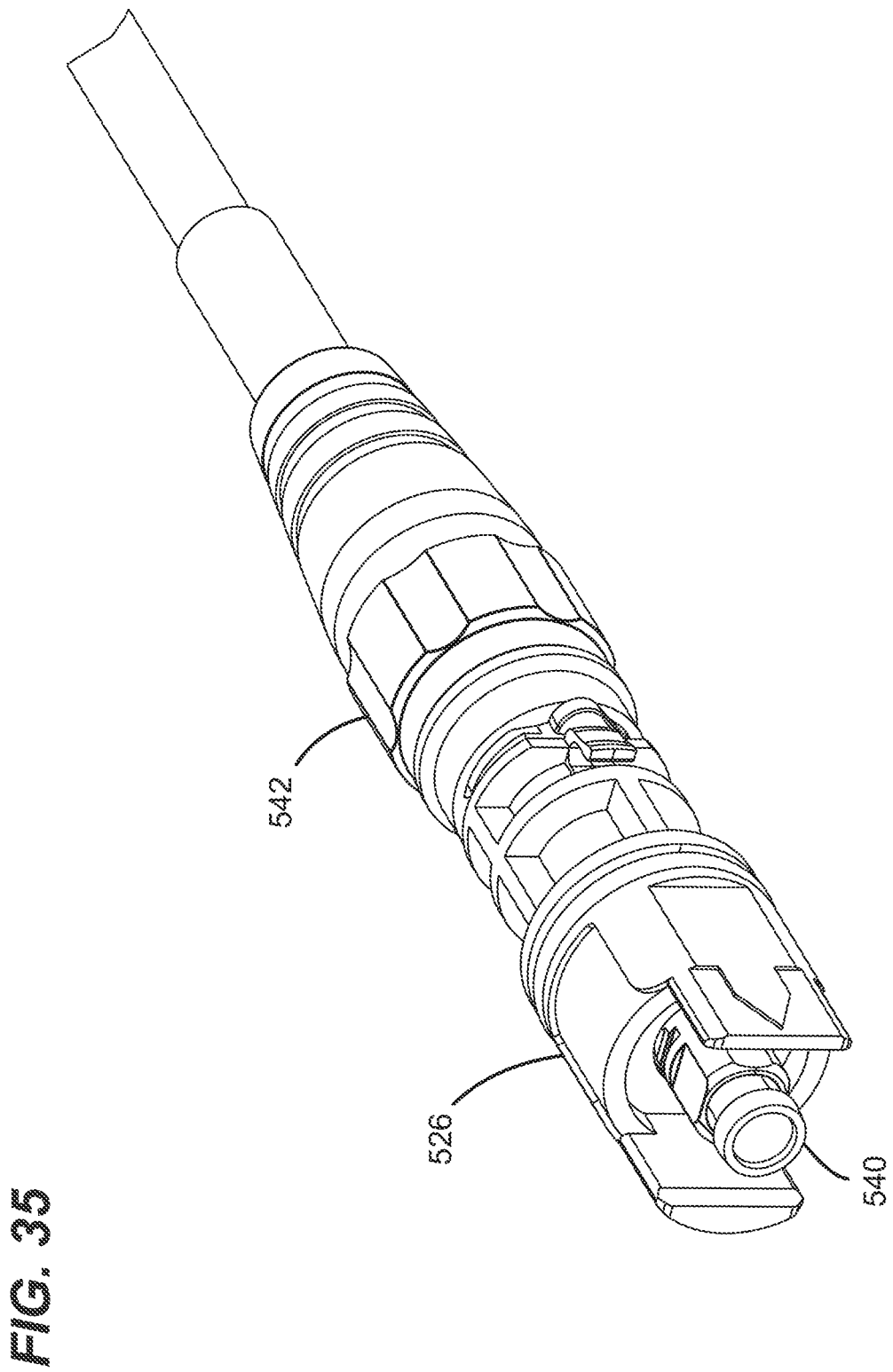
FIG. 35 shows the fiber optic connector of FIG. 34 with an outer fastener and outer dust cap removed.
Figure 36:
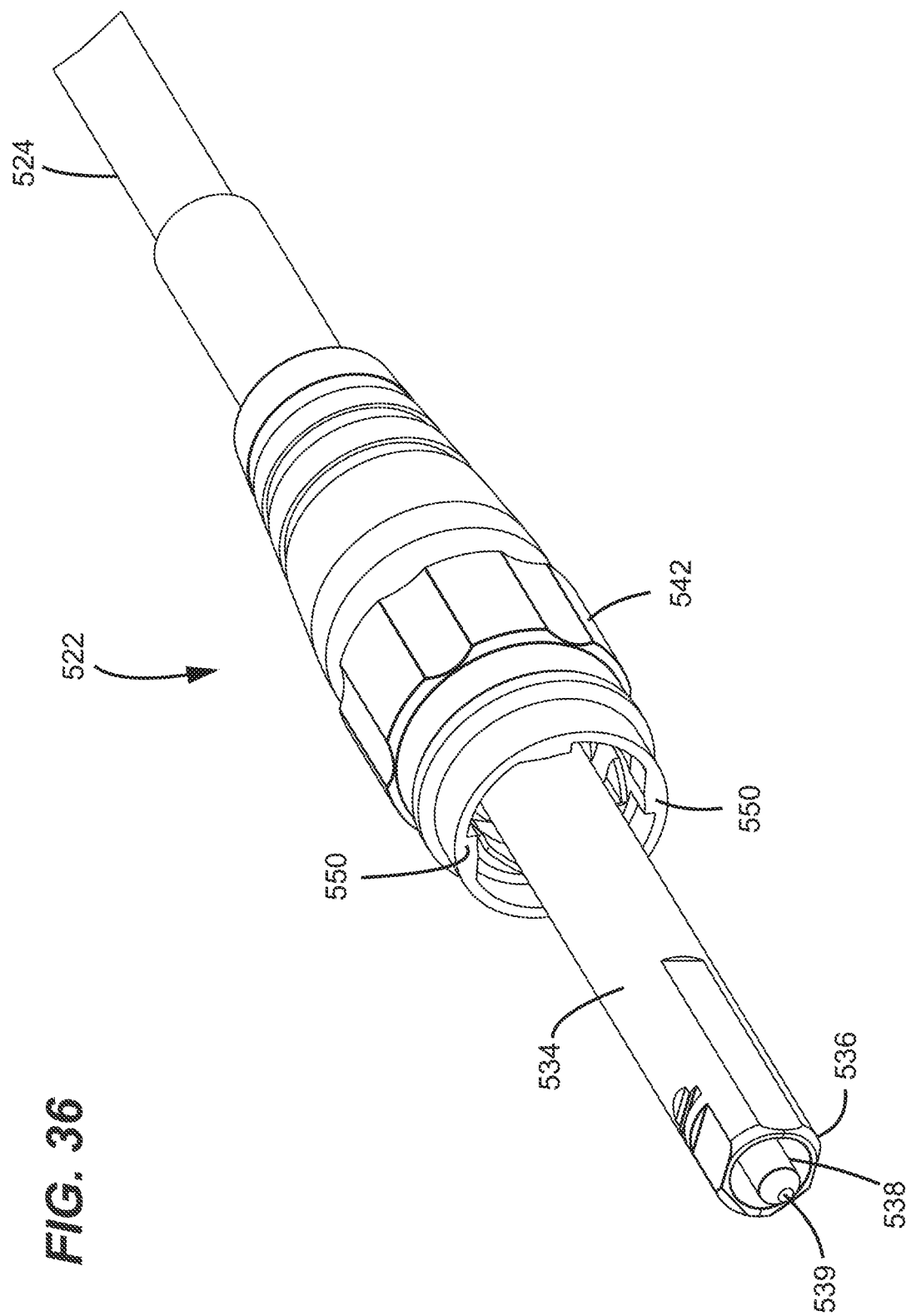
FIG. 36 depicts a core assembly of the fiber optic connector of FIG. 34.
Figure 37:
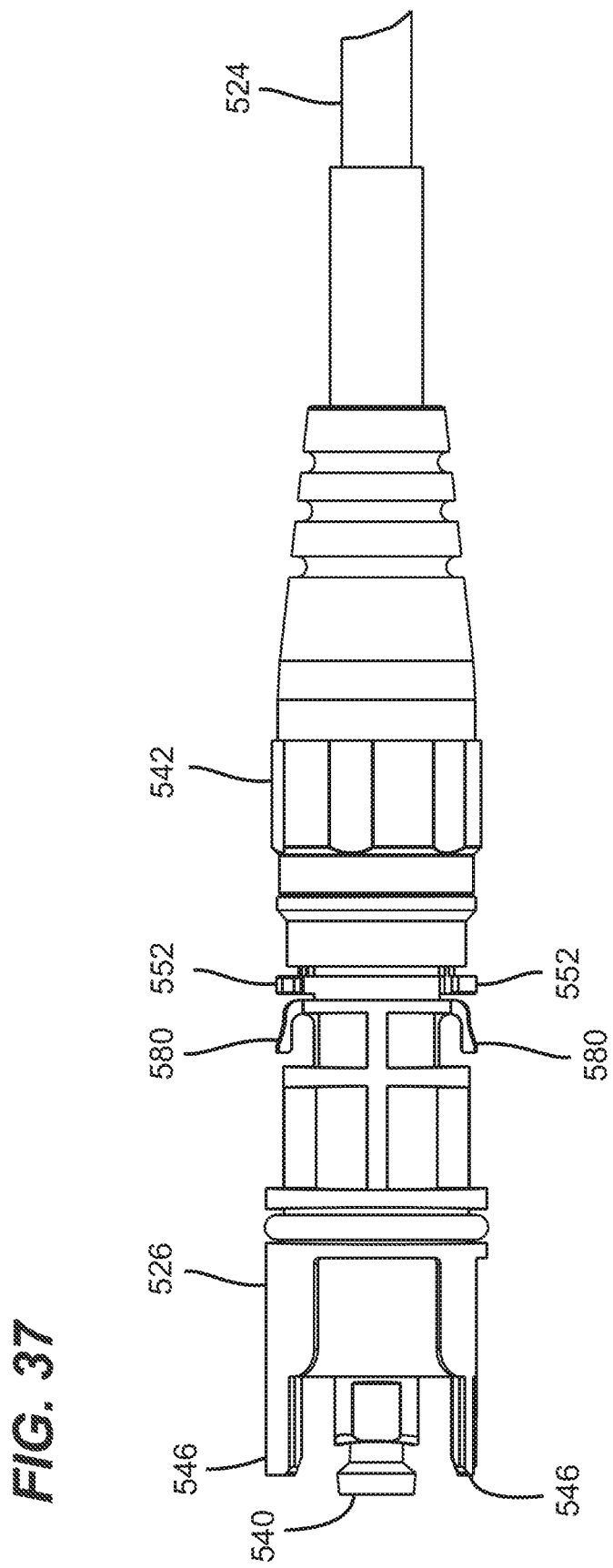
FIG. 37 is a side view of the fiber optic connector of FIG. 34 with the outer dust cap and outer fastener removed.
Figure 38:
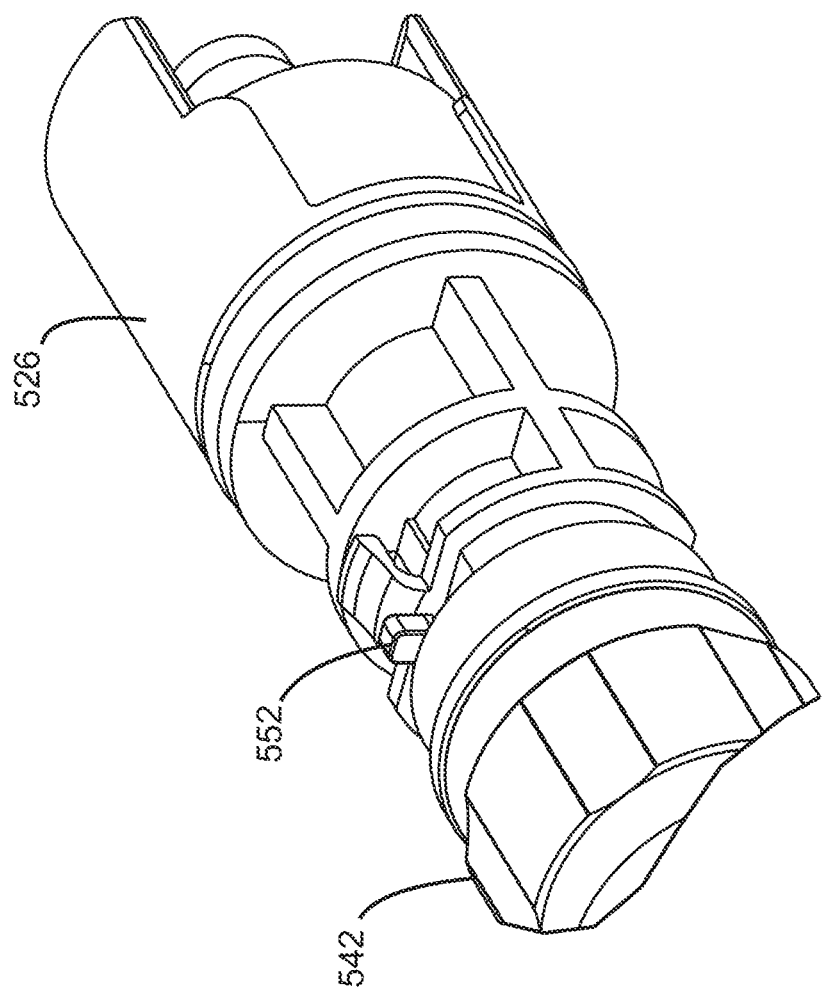
FIG. 38 is a perspective view of a portion of the assembly of FIG. 37.

The core 534 of the core assembly 522 includes an end 536 supporting a ferrule 538 (see FIG. 36). It will be appreciated that the ferrule 538 is adapted for supporting an end portion of an optical fiber 539 corresponding to the fiber optic cable 524. As shown at FIGS. 33 and 35, the ferrule 538 is protected by a removable inner dust cap 540. The core assembly 522 also includes a retaining sleeve 542 for securing the core assembly 522 to a rear end 544 of the shroud 526. It will be appreciated that the shroud 526 fits over the core 534 and can include a key arrangement 546 adapted to mate with a corresponding arrangement provided in a fiber optic adapter to ensure the fiber optic connector 520 is inserted into the fiber optic adapter at a particular rotational position. In certain examples, different shrouds having different configurations can be interchangeably mounted over the core 534 to provide compatibility with different types of fiber optic adapters (e.g., see U.S. Pat. No. 9,733,436, which is hereby incorporated by reference in its entirety).

It will be appreciated that a turn-to-secure connection interface can also be provided between the rear end 544 of the shroud 526 and the retaining sleeve 542. For example, rear end 544 of the shroud 526 can include a stop arrangement that interlocks with a corresponding stop arrangement of the retaining sleeve 542 when the retaining sleeve 542 and the rear end 544 of the shroud 526 are rotationally locked together (i.e., moved from a first rotational state in which the parts can be axially separated from one another to a second rotational state in which the parts are prevented from being axially separated from one another). The stop arrangements can be of the type previously described herein.

Figure 41:
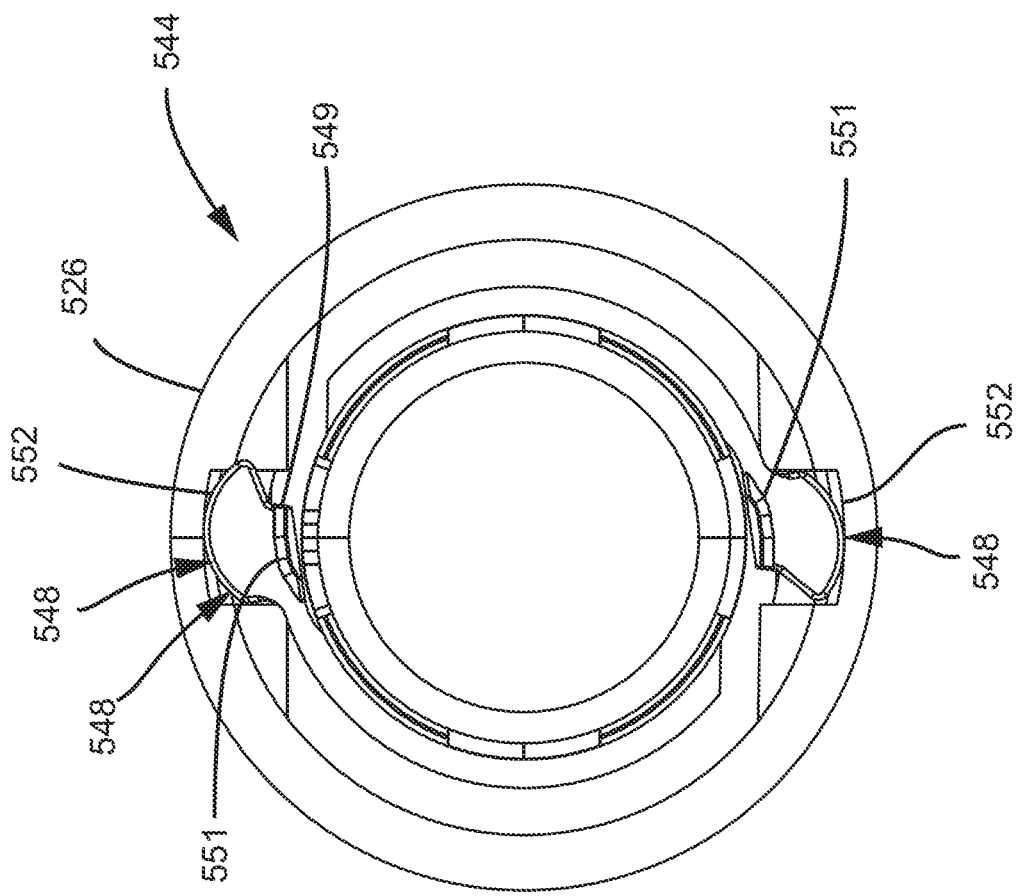
FIG. 41 is an end view showing a rear latch arrangement integrated with a shroud of the assembly of FIG. 37.

The interface can also include a snap-fit arrangement for retaining the retaining sleeve 542 in an interlocked rotational position (e.g., the second rotational state) relative to the rear end 544 of the shroud 526. In the depicted example, the snap-fit arrangement includes resilient latches 548 provided on the shroud 526 (see FIG. 41) that interlock with corresponding catches 550 (e.g., stops) of the retaining sleeve 542 (see FIG. 36) when the retaining sleeve 542 is rotated relative to the shroud 526 to a retaining rotational position (e.g., the second rotational state). Engagement (e.g., latching) between the resilient latches 548 and the catches 550 prevents the retaining sleeve 542 from being rotated relative to the shroud 526 from the retaining rotational position back to the release rotational position (e.g., the first rotational state). It will be appreciated that when the retaining sleeve 542 is in the retaining rotational position relative to the shroud 526, the retaining sleeve 542 and the shroud 526 are locked together. By contrast, when the retaining sleeve 542 is in the release rotational position relative to the shroud 526, the retaining sleeve 542 and the shroud 526 can be axially separated from one another.

Figure 39:
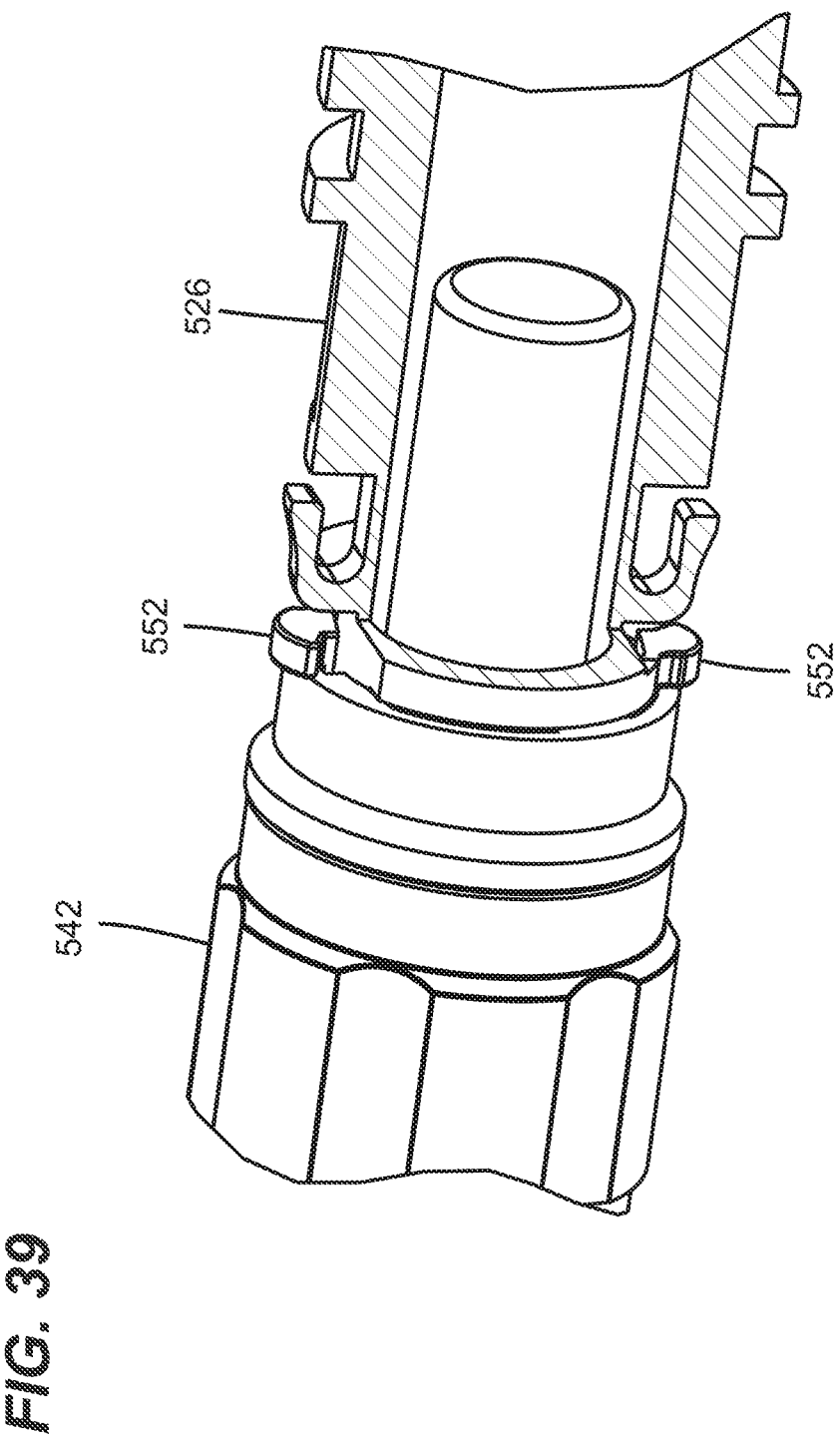
FIG. 39 is a cross-sectional view showing a portion of the assembly of FIG. 37.
Figure 40:
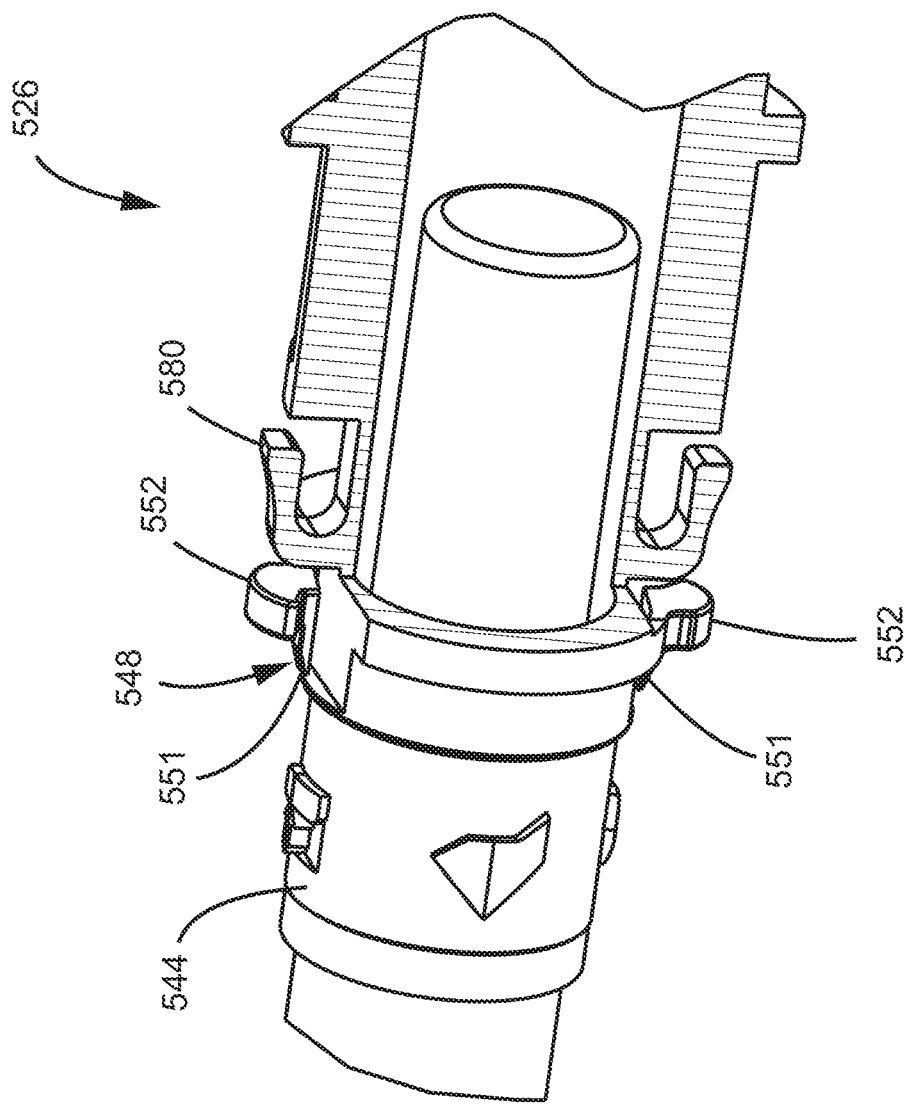
FIG. 40 is another cross-sectional view of the assembly of FIG. 37.

Referring to FIGS. 35 and 37-41, the resilient latches 548 of the snap-fit arrangement include release actuation portions 552 (e.g., tabs, buttons, bumps, etc.) that are exposed and accessible when the retaining sleeve 542 and the shroud 526 are mated together in the retaining rotational position (e.g., see FIG. 39). The latches 548 include engagement portions 551 that project axially from the release actuation portions 552 (see FIGS. 40 and 41). The engagement portions 551 move in unison with the release actuation portions 552. The engagement portions 551 have stop surfaces 549 (FIG. 41) that are adapted to engage the stops 550 of the retaining sleeve 542 (see FIG. 36) to provide rotational locking. For example, the engagement with the ramped portion of the catches 550 deflects the engagement portions 551 (and hence the release actuation portions 552) inward to a non-latching position until the engagement portion 551 clears the stop 550. Then the engagement portion 551 undeflects back to the latching position where the stop surface 549 abuts the shoulder of the stop 550. The release actuation portions 552 of the latches 548 can be depressed to move the engagement portions 551 of the resilient latches 548 from a latching position to a non-latching position where the stop surface 549 clears the catch 550. The resilient latches 548 are preferably spring-biased toward the latching position. When the resilient latches 548 have been depressed to the non-latching position, the snap-fit interface does not prevent the retaining sleeve 542 from being rotated relative to the shroud 526 from the retaining rotational position to the release rotational position.

Figure 42:
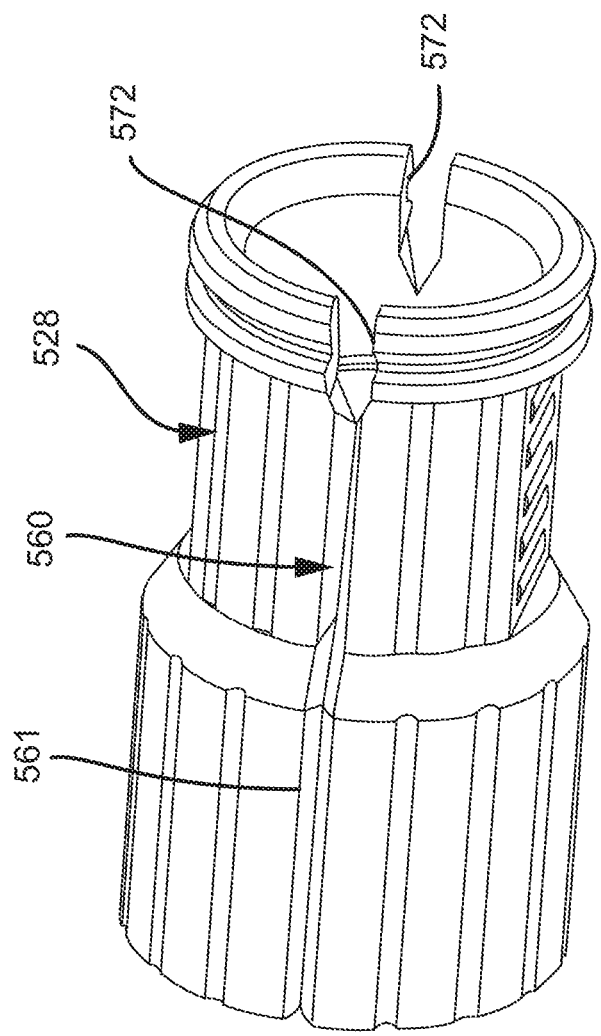
FIG. 42 is a perspective view of the outer fastener of the fiber optic connector of FIG. 34.
Figure 43:
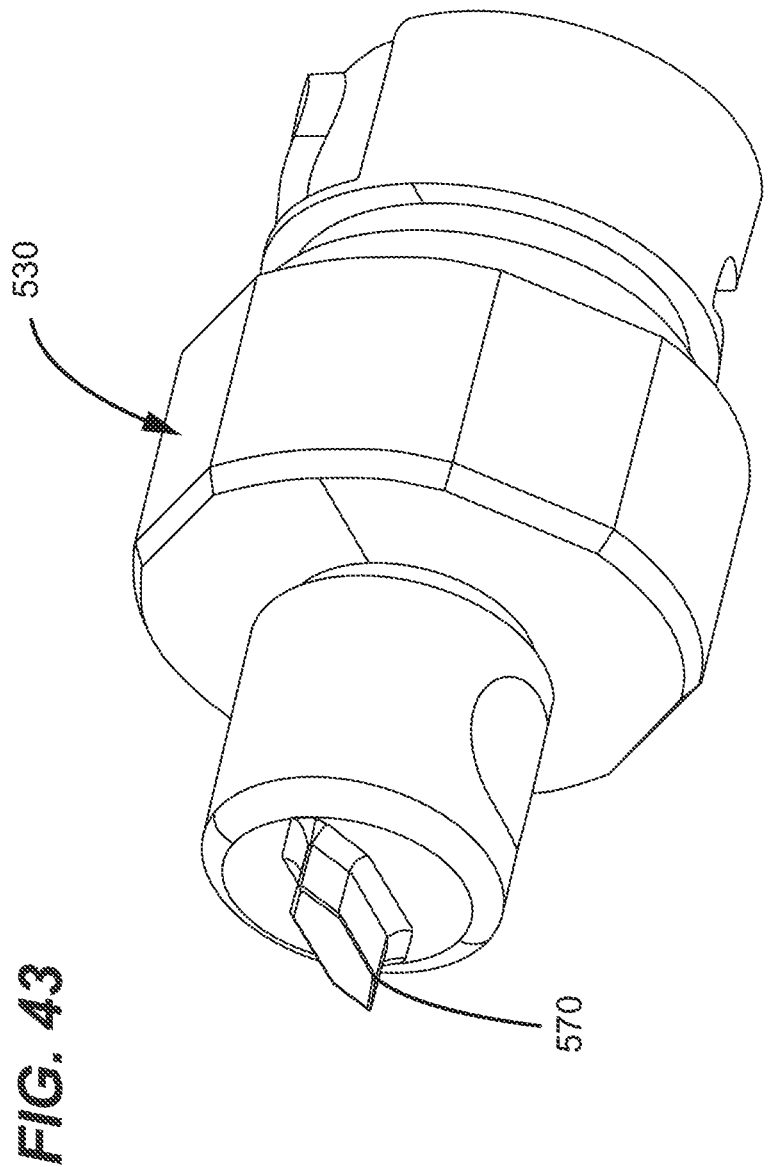
FIG. 43 is a perspective view of the outer dust cap of the fiber optic connector of FIG. 34.
Figure 44:
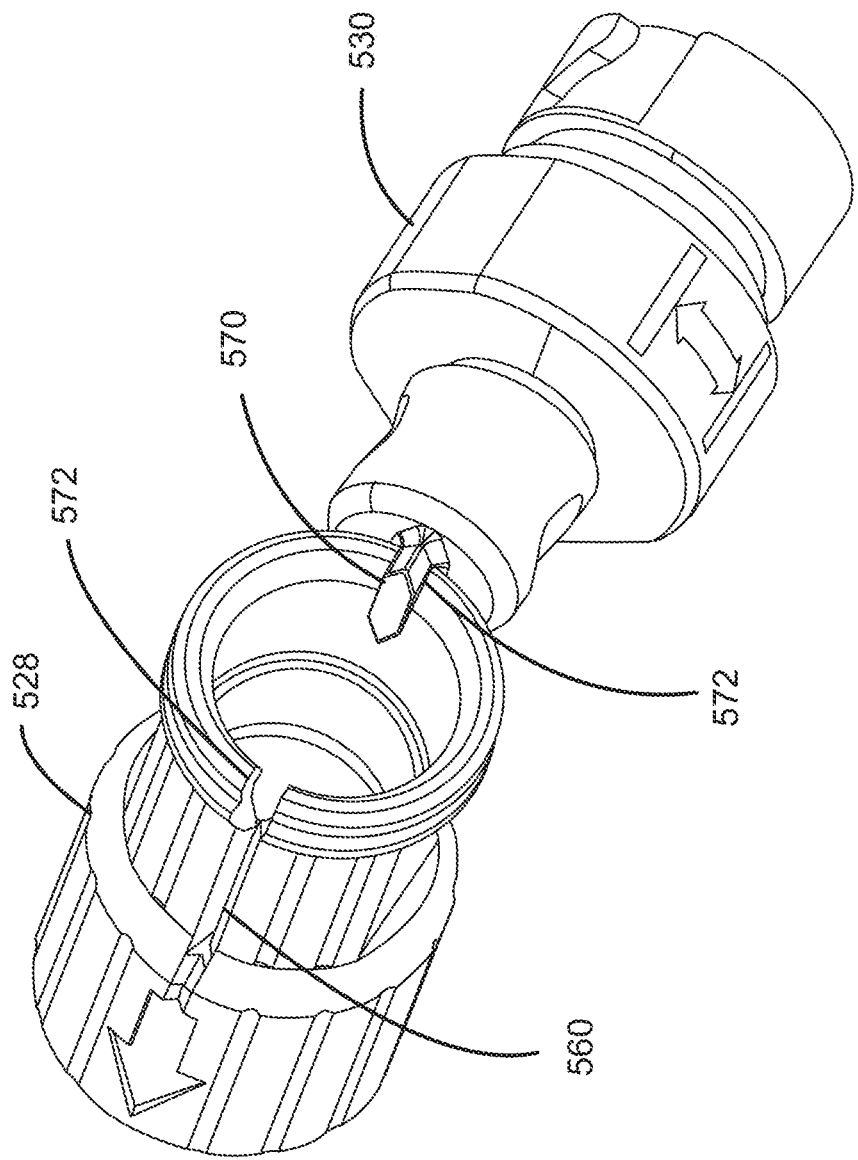
FIG. 44 is a perspective view showing the outer dust cap of FIG. 43 being used to pry open the outer fastener of FIG. 42.

When the outer fastener 528 is mounted over the shroud 526 as shown at FIG. 34, the outer fastener 528 covers and blocks access to the release actuation portions 552. Therefore, while the outer fastener 528 is mounted over the shroud 526, the release actuation portions 552 are inaccessible and the retaining sleeve 542 is prevented by the snap-fit interface from being rotated from its retaining rotational position to its release rotational position relative to the shroud 526. To access the release actuation portions 552, the outer fastener 528 can be removed from the shroud 526 by detaching the lanyard 532 from the outer fastener 528 and then breaking the outer fastener 528. In certain examples, the outer fastener 528 can include a predefined break location 560 (see FIG. 42). In one example, the pre-defined break location 560 can include a predefined break line 561 defined by a line of reduced cross-sectional area defined through a thickness of the fastener 528. The reduced thickness can be provided by a longitudinal slit provided axially along the body of the outer fastener 528.

In certain examples, a tool carried by the outer dust cap 530 can be used to break the outer fastener 528 along the predefined break line. In one example, a pry tool 570 can be integrated with the outer dust cap 530. The pry tool 570 can be configured to fit within a pry tool receiving notch 572 defined by the outer fastener 528 at the predefined break location. By inserting the pry tool 570 in the pry tool receiving notch 572 and twisting the dust cap, the outer fastener 528 can be cracked along the longitudinal break line 561 or lines. In one example, break locations 560 are provided at opposite sides of the fastener 528 to allow the fastener 528 to be broken in half by breaking the fastener 528 at each of the break locations 560.

It will be appreciated that during assembly of the fiber optic connector 520, a rear end of the lanyard 532 and the outer fastener 528 are initially inserted over the core assembly 522. Next, the shroud 526 is inserted over the core 534 of the core assembly 522 and the retaining sleeve 542 of the core assembly 522 is interlocked with the rear end 544 of the shroud 526 to mechanically couple the shroud 526 to the core assembly 524. The outer fastener 528 is then slid forwardly over the shroud 526 past fastener latches 580 (FIG. 37) that function to retain the outer fastener 528 on the shroud 526. It will be appreciated that the outer fastener 528 can rotate about the shroud 526. Thereafter, the front end of the lanyard 532 can be coupled to the outer dust cap 530 and the outer dust cap can be secured to the remainder of the fiber optic connector by threading the threaded interface of the outer fastener 528 into the threaded interface of the outer dust cap 530. The fastener latches 580 prevent the outer fastener 528 from being removed from the shroud 526 without breaking the outer fastener 528 at the predefined break location.

Figure 45:
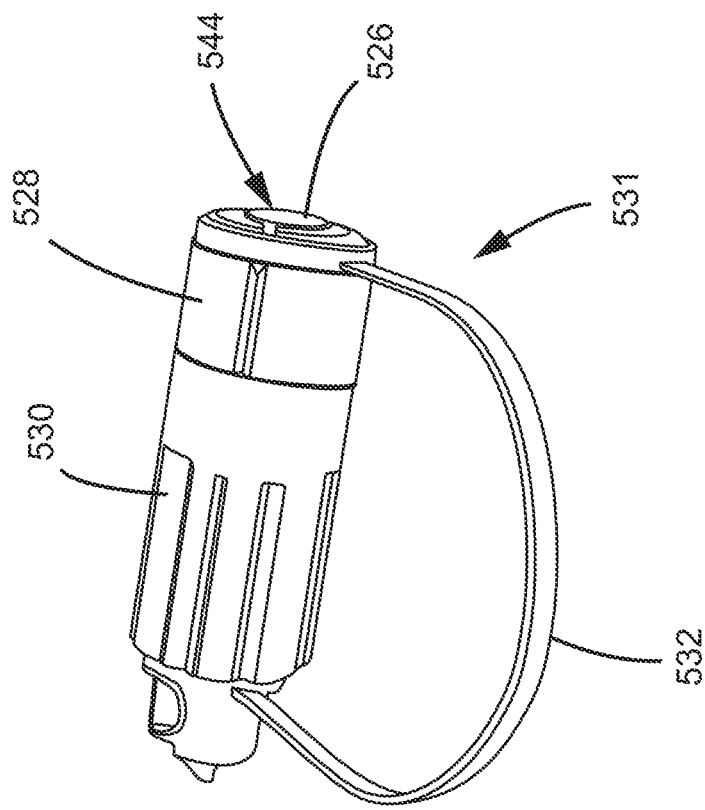
FIG. 45 depicts a pre-assembly including the dust cap, lanyard, fastener and shroud of FIG. 33.

Referring to FIG. 45, the dust cap 530, lanyard 532, fastener 528 and shroud 526 of FIG. 33 can form an assembly 531 that is pre-assembled together prior to connection to the core assembly 522. As depicted, one end of the lanyard 532 couples to the dust cap 530 (e.g., adjacent the front end of the dust cap) and the opposite end of the lanyard couples to the outer fastener 528 (e.g., adjacent a rear end of the fastener). A forward portion of the shroud 526 fits within the dust cap 530 and the fastener 528 mounts over a rear portion of the shroud 526. The fastener 528 couples to the dust cap 530 by a turn-to-secure connection and retains the shroud 526 within the dust cap 530. The pre-assembled nature of the assembly 531 prevents the loss of parts and facilitates use in the field. In certain examples, the core assembly 522 can be coupled to the shroud 526 via a turn-to-secure connection without requiring disassembly of the assembly 531. For example, the core 534 of the core assembly 522 is inserted into the shroud 526 through a rear end the shroud 526 which is accessible at a rear end of the assembly 531. Also, the retaining sleeve 542 of the core assembly 522 is interlocked with the rear end 544 of the shroud 526 to mechanically couple the shroud 526 to the core assembly 524. It will be appreciated that a turn-to-secure connection interface at the rear end 544 of the shroud 526 is accessible at the rear end of the assembly 531 for coupling with the retaining sleeve 542. In other examples, at least partial disassembly of the assembly 531 may be required for connection to the core assembly 522.

It will be appreciated that the first and second stop arrangements disclosed herein provide two separate interlock functions when in the coupled rotational state. One of the interlock function provides interlocking features that interlock to resist axial movement between the two components desired to be coupled together. For example, the axial interlock features interlock to prevent a first one of the components from being axially disengaged or withdrawn from the second component. A second interlocking feature can be provided by a snap-fit feature that functions to prevent rotational movement between the two components when the two components are in the coupled rotational state. The second interlocking feature functions to prevent or resist the components from being rotated from the coupled rotational state in which the components are axially secured together to the non-coupled rotational state in which the two components can be axially separated from one another. The components can include fiber optic connectors, connector retention sleeves, fiber optic adapters, dust caps, retention sleeves, rotatable fastening elements, connector pieces, connector shrouds, and the like.

What is claimed is:

1. A turn-to-secure connection interface comprising:
    first and second components that are axially insertable together and that are aligned along an axis when axially inserted together;
    the first component including a rotational securement latch, the first component also including a first stop arrangement including a first stop surface that faces in a first axial direction along the axis and a second stop surface that faces in a second axial direction along the axis, the first axial direction being opposite from the second axial direction, the first component further including a third stop surface that faces in a first rotational direction about the axis;
    the second component including a rotational securement catch, the second component also including a second stop arrangement including a fourth stop surface that faces in the second axial direction, a fifth stop surface that faces in the first axial direction, and a sixth stop surface that faces in a second rotational direction about the axis that is opposite from the first rotational direction;
    the turn-to-secure connection interface being positionable in a first rotational state in which the first stop surface opposes the fourth stop surface, the second stop surface is rotationally offset from the fifth stop surface, and the third stop surface is rotationally offset from the sixth stop surface by a rotation angle less than or equal to 360 degrees;
    the turn-to-secure connection interface being positionable in a second rotational state in which the first stop surface opposes the fourth stop surface, the second stop surface opposes the fifth stop surface, and the third stop surface opposes and is adjacent to the sixth stop surface;
    the turn-to-secure connection interface being moveable from the first rotational state to the second rotational state by rotating first and second components relative to one another through the rotation angle;
    the rotational securement latch and the rotational securement catch circumferentially opposing one another when the turn-to-secure connection interface is in the second rotational state to resist the turn-to-secure interface from rotating from the second rotational state to the first rotational state; and
    wherein contact between the rotational securement latch and the rotational securement catch as the turn-to-secure connection interface is moved from the first rotational state to the second rotational state causes the rotational securement latch to resiliently flex from a securement position to a clearance position to allow the rotational securement latch and the rotational securement catch to move rotationally past one another, and wherein the rotational securement latch elastically returns to the securement position after the rotational securement latch and the rotational securement catch have moved past one another to resist the turn-to-secure interface from rotating from the second rotational state to the first rotational state.

2. The turn-to-secure connection interface of claim 1, wherein the first component is a fiber optic adapter or a dust cap, wherein the second component is a fastener of a fiber optic connector.

3. The turn-to-secure connection interface of claim 1, wherein the rotational securement latch includes a beam having first and second ends fixed relative to a main body of the first component, wherein a length of the beam extends across an open space defined between the beam and the main body.

4. The turn-to-secure connection interface of claim 3, wherein the beam includes a first side surface that faces in the first rotational direction and a second side surface that faces in the second rotational direction, wherein the rotational securement catch includes a ramp surface that faces in the second rotational direction and a seventh stop surface that faces in the first rotational direction, wherein the ramp surface engages the first side surface to move the beam from the securement position to the clearance position, and wherein the seventh stop surface opposes the second side surface to resist the turn-to-secure interface from rotating from the second rotational state to the first rotational state.

5. The turn-to-secure connection interface of claim 1, wherein the first component includes at least one first triangular projection having a first side defining the second stop surface and a second side defining the third stop surface, and wherein the second component includes at least one recess having at least a portion that triangular and is defined by a first side defining the fifth stop surface and a second side defining the sixth stop surface.

6. The turn-to-secure connection interface of claim 5, wherein the second stop surface and the fifth stop surface are oriented on reference planes that are perpendicular with respect to the axis.

7. The turn-to-secure connection interface of claim 6, wherein the first triangular projection includes a corner that faces in the first axial direction.

8. The turn-to-secure connection interface of claim 1, wherein the rotational securement latch is required to be damaged to rotate the turn-to-secure interface from the second rotational state to the first rotational state.

9. A turn-to-secure connection interface comprising:
    a first component defining a first axis and a second component defining a second axis, the first and second components being configured to be axially inserted together and mechanically coupled together when the first and second components are co-axially aligned, the first component including a first stop arrangement and the second component including a second stop arrangement;
    the first and second components being configured to be rotated relative to one another about the first and second axes between first and second rotational states when the first and second components have been axially inserted together, the first and second stop arrangements being configured to limit a range of rotational movement between the first and second rotational states, the first and second stop arrangements being configured to allow the first and second components to be axially separated from one another when the first and second components are in the first rotational state, and to prevent the first and second components from being axially separated from one another when the first and second components are in the second rotational state; and the first and second components including a snap-fit arrangement for resisting movement of the first and second components from the second rotational state to the first rotational state;

wherein the first and second stop arrangements respectively include triangular projections and recesses having at least portions that are triangular, wherein the triangular projections of the first stop arrangement are spaced circumferentially about the first axis, wherein recesses of the second stop arrangement are spaced circumferentially about the second axis, and wherein the triangular projections have corners that face in a first axial direction and the recesses have access gaps that taper open to receive the triangular projections when the first and second components are inserted axially together.

10. The turn-to-secure interface of claim 9, wherein the snap-fit arrangement is required to be broken to move the first and second components from the second rotational state to the first rotational state.

11. The turn-to-secure interface of claim 9, wherein the first and second components do not move axially relative to each other as the first and second components are rotated between the first and second rotational states.

12. The turn-to-secure interface of claim 11, wherein the snap-fit arrangement is required to be broken to move the first and second components from the second rotational state to the first rotational state.

13. The turn-to-secure interface of claim 9, wherein the snap-fit arrangement interlocks without requiring axial movement between the first and second components.

14. The turn-to-secure interface of claim 9, wherein the snap-fit arrangement is not required to be broken to move the first and second components from the second rotational state to the first rotational state.

15. The turn-to-secure interface of claim 14, further comprising a retention collar non-rotatably mounted on one of the first and second components and slideable from a first position where the retention collar prevents relative rotation between the first and second components and a second position where the retention collar allows rotation between the first and second components.

16. The turn-to-secure interface of claim 15, wherein the retention collar is spring biased toward the first position.

17. The turn-to-secure interface of claim 9, wherein at least one of the first and second stop arrangements includes a tapered lead-in for moving the first and second components toward a fully axially inserted position as the first and second components are rotated from the first rotational state to the second rotational state.

18. A turn-to-secure interface comprising:

a first component defining a first axis and a second component defining a second axis, the first and second components being configured to be axially inserted together and mechanically coupled together when the first and second components are co-axially aligned, the first component including a first stop arrangement and the second component including a second stop arrangement;

the first and second components being configured to be rotated relative to one another about the first and second axes between first and second rotational states when the first and second components have been axially inserted together, the first and second stop arrangements being configured to limit a range of rotational movement between the first and second rotational states, the first and second stop arrangements being configured to allow the first and second components to be axially separated from one another when the first and second components are in the first rotational state, and to prevent the first and second components from being axially separated from one another when the first and second components are in the second rotational state; and the first and second components including a snap-fit arrangement for resisting movement of the first and second components from the second rotational state to the first rotational state;

wherein the first and second stop arrangements respectively include triangular projections and recesses having at least portions that are triangular, wherein the triangular projections of the first stop arrangement are spaced circumferentially about the first axis, wherein recesses of the second stop arrangement are spaced circumferentially about the second axis, and wherein the triangular projections each include a first side defining an axial stop surface and a second side defining a rotational stop surface.

19. A turn-to-secure interface comprising:

a first component defining a first axis and a second component defining a second axis, the first and second components being configured to be axially inserted together and mechanically coupled together when the first and second components are co-axially aligned, the first component including a first stop arrangement and the second component including a second stop arrangement;

the first and second components being configured to be rotated relative to one another about the first and second axes between first and second rotational states when the first and second components have been axially inserted together, the first and second stop arrangements being configured to limit a range of rotational movement between the first and second rotational states, the first and second stop arrangements being configured to allow the first and second components to be axially separated from one another when the first and second components are in the first rotational state, and to prevent the first and second components from being axially separated from one another when the first and second components are in the second rotational state; and the first and second components including a snap-fit arrangement for resisting movement of the first and second components from the second rotational state to the first rotational state;

wherein the snap-fit arrangement includes a flexible beam latch integrated with the first component having fixed ends and a catch integrated with the second component having a ramp surface for flexing the flexible beam latch to a clearance position to allow the first and second components to be rotated from the first rotational state to the second rotational state, and a retention surface for engaging the flexible beam latch to resist the first and second components from rotating from being rotated from the second rotational state to the first rotational state.

20. A turn-to-secure interface comprising:

a first component defining a first axis and a second component defining a second axis, the first and second components being configured to be axially inserted together and mechanically coupled together when the first and second components are co-axially aligned, the first component including a first stop arrangement and the second component including a second stop arrangement;

the first and second components being configured to be rotated relative to one another about the first and second axes between first and second rotational states when the first and second components have been axially inserted together, the first and second stop arrangements being configured to limit a range of rotational movement between the first and second rotational states, the first and second stop arrangements being configured to allow the first and second components to be axially separated from one another when the first and second components are in the first rotational state, and to prevent the first and second components from being axially separated from one another when the first and second components are in the second rotational state; and the first and second components including a snap-fit arrangement for resisting movement of the first and second components from the second rotational state to the first rotational state;

wherein the snap-fit arrangement includes a flexible beam latch integrated with the first component and a catch integrated with the second component having a ramp surface for flexing the flexible beam latch to a clearance position to allow the first and second components to be rotated from the first rotational state to the second rotational state, and a retention surface for engaging the flexible beam latch to resist the first and second components from rotating from being rotated from the second rotational state to the first rotational state.

21. The turn-to-secure interface of claim 20, wherein the flexible beam latch has a cantilevered configuration.

22. The turn-to-secure interface of claim 20, wherein the flexible beam latch has a length that extends in a direction transverse to a direction of rotation between the first and second rotational states.

23. The turn-to-secure interface of claim 20, wherein the flexible beam latch has a length that extends in a direction parallel to a direction of rotation between the first and second rotational states.

24. The turn-to-secure interface of claim 23, wherein the flexible beam latch has a cantilevered configuration.

25. The turn-to-secure interface of claim 24, wherein the flexible beam latch includes an axially offset portion adjacent a free end of the flexible beam latch adapted to engage the ramp surface when the first and second components are rotated from the first rotational state to the second rotational state.

26. The turn-to-secure interface of claim 25, wherein the axially offset portion is ramped.

* * * * *